United States Patent [19]
Garris

[11] Patent Number: 6,138,456
[45] Date of Patent: Oct. 31, 2000

[54] PRESSURE EXCHANGING EJECTOR AND METHODS OF USE

[75] Inventor: Charles Alexander Garris, Vienna, Va.

[73] Assignee: The George Washington University, Washington, D.C.

[21] Appl. No.: 09/326,899

[22] Filed: Jun. 7, 1999

[51] Int. Cl.[7] .................................................. F01K 25/06
[52] U.S. Cl. ................................ 60/649; 60/673; 417/178
[58] Field of Search ........................... 60/649, 670, 673; 417/178, 179, 180, 194

[56] References Cited

U.S. PATENT DOCUMENTS

| | | | |
|---|---|---|---|
| 246,084 | 8/1881 | Coll | 103/264 |
| 2,623,474 | 12/1952 | Friedmann | 417/178 |
| 2,786,651 | 3/1957 | Mickle | 255/24 |
| 3,046,732 | 7/1962 | Foa | 60/35.6 |
| 3,216,649 | 11/1965 | Foa | 230/1 |
| 3,259,176 | 7/1966 | Rice et al. | 165/26 |
| 3,361,336 | 1/1968 | Foa | 417/225 |
| 3,367,563 | 2/1968 | Hertzberg et al. | 230/69 |
| 4,239,155 | 12/1980 | Foa | 239/265.17 |
| 4,439,988 | 4/1984 | Minardi et al. | 60/649 |
| 4,460,545 | 7/1984 | Jouffroy et al. | 60/649 X |
| 4,487,553 | 12/1984 | Nagata | 417/171 |
| 4,505,646 | 3/1985 | Long et al. | 417/178 X |
| 4,679,393 | 7/1987 | Hellat et al. | 60/39 |
| 4,843,823 | 7/1989 | Freedman | 60/649 |
| 4,865,518 | 9/1989 | Foa | 417/54 |
| 4,905,481 | 3/1990 | Scaringe | 62/500 |
| 5,088,896 | 2/1992 | Nielsen et al. | 417/178 |
| 5,117,648 | 6/1992 | Kowalski et al. | 62/500 |
| 5,220,781 | 6/1993 | Keller | 60/39.02 |
| 5,239,837 | 8/1993 | Kowalski | 62/238.6 |
| 5,309,736 | 5/1994 | Kowalski et al. | 62/500 |
| 5,575,625 | 11/1996 | Castel | 417/178 |
| 5,616,006 | 4/1997 | Castel | 417/54 |
| 5,647,221 | 7/1997 | Garris | 62/116 |
| 5,716,196 | 2/1998 | Castel | 417/178 |

OTHER PUBLICATIONS

Huang, B. J., Jiang, C. B., Hu, F. L.: "Ejector Performance Characteristics and Design Analysis of Jet Refrigeration Systems", J.Engineering for Gas Turbines and Power, ASME, v107, pp. 792–802, Jul. 1985.

Al–Khalidy, N.: "An Experimental Study of an Ejector Cycle Refrigeration Machine Operating on R113", Int.J of Refrigeration, v. 21, No. 8, pp. 617–625, 1998.

Weatherson, R. C., Hertzberg, A.: "The Energy Exchanger, a New Concept for High–Efficiency Gas Turbine Cycles", J. of Engineering for Power, ASME, pp. 217–237, Apr. 1967.

Welch, G. E., Jones, S. M., Paxson, D. E.: "Wave–Rotor Enhanced Gas Turbine Engines", Paper AIAA–95–2799, 31st Joint Propulsion Conference, AIAA, Jul. 1995.

Decher, R.: "Energy Conversion: Systems, Flow Physics, and Engineering", Chapter 11, Oxford University Press, 1994.

Freedman, B. Z., Lior, N.: "A Novel High–Temperature Ejector Topping Power Cycle", J. of Engineering for Gas Turbines and Power, ASME, pp. 1–7, v. 116, Jan. 1994.

*Primary Examiner*—Hoang Nguyen

[57] ABSTRACT

A novel pressure-exchange ejector is disclosed whereby a high energy primary fluid compresses a lower energy secondary fluid through direct fluid-fluid momentum exchange. The pressure-exchange ejector utilizes non-steady flow principles and supersonic flow principles to obtain an ejector-compressor which can attain substantially higher adiabatic efficiencies than conventional ejectors while retaining much of the simplicity of construction and the low manufacturing cost of a conventional ejector. By virtue of the capabilities of the ejector to compress high volumes of secondary fluid, an ejector refrigeration system utilizing water and other environmentally benign refrigerants is disclosed. By virtue of the capability of the pressure-exchange ejector to operate at temperatures exceeding the capability of conventional turbo-machinery, topping cycles for both a Rankine power cycle and a gas turbine engine are disclosed which will increase their thermal efficiencies and thereby save non-renewable energy reserves and reduce the emissions of greenhouse gases.

25 Claims, 15 Drawing Sheets

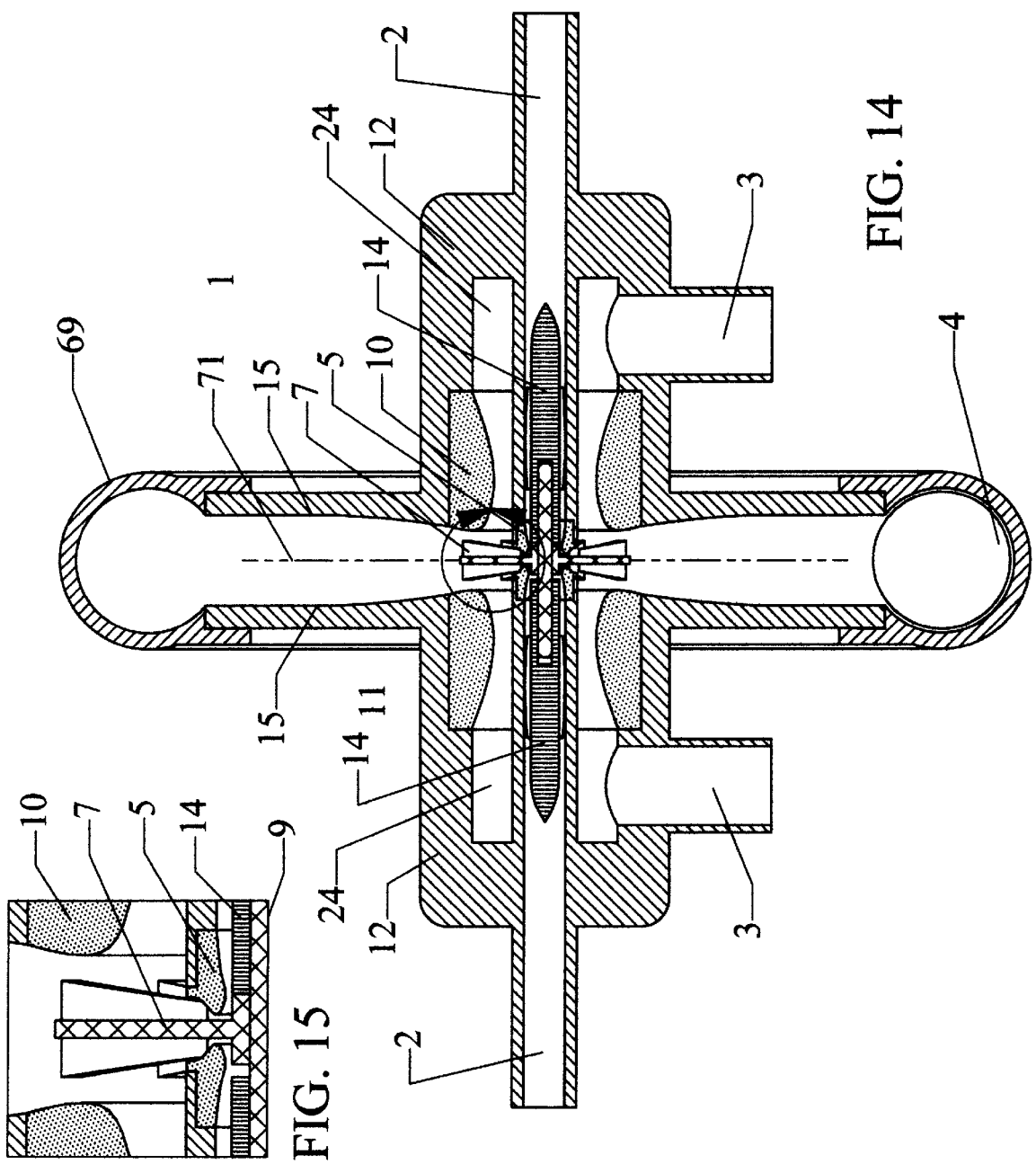

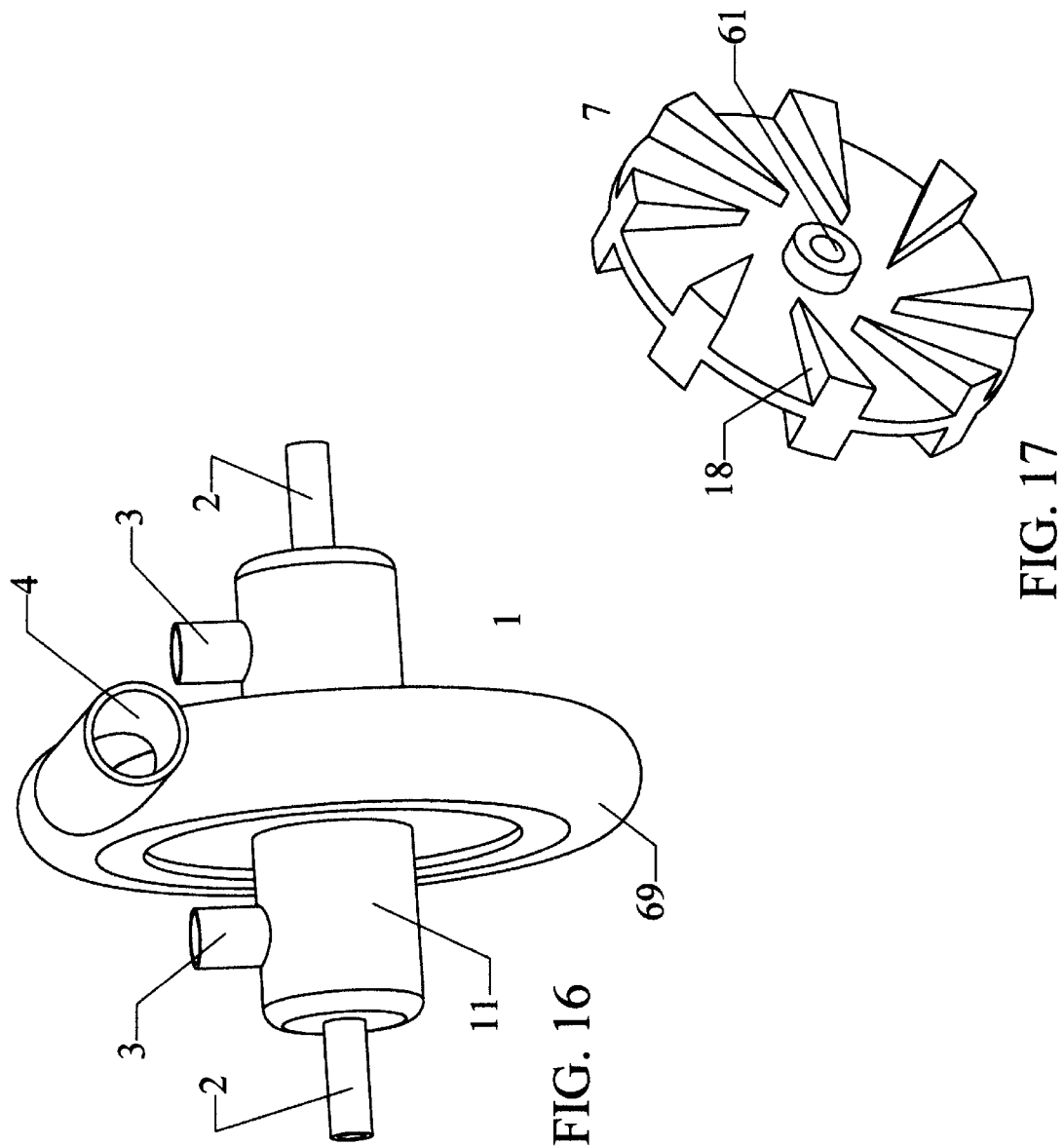

PRESSURE EXCHANGING EJECTOR AND METHODS OF USE

FIELD OF INVENTION

This invention relates to ejector compressors and, in particular, to their application to environmentally beneficial and energy efficient technologies in refrigeration and power generation.

BACKGROUND OF INVENTION

During the course of the 20$^{th}$ Century, science and engineering have brought us to an era whereby every American enjoys the availability of abundant energy as well as advanced technology for heating and air-conditioning of homes, transportation, and industry. Nevertheless, these wonders of modern society have come at a severe price to our global environment and to our reserves of non-renewable natural resources. Fossil fueled electrical power generation and automobiles have increased the level of carbon dioxide in the atmosphere to the point where deleterious global warming effects on the environment are predicted. Furthermore, due to the release of chlorofluorocarbons (CFC's) from conventional refrigeration and air conditioning systems, the ozone layer protecting the earth from deadly ultraviolet radiation is being depleted, with serious projected consequences for mankind. This crisis is considered so serious that 159 nations, including the United States, met in Kyoto, Japan in December of 1997 and signed a treaty designed to limit the buildup of carbon dioxide and other greenhouse gases in our environment. Immediately following the signing of the treaty, there was an outpouring of concern that meeting the targets outlined in Kyoto would be impossible without either modifying radically the American way of life, or of finding new energy-efficient and non-polluting technologies.

In refrigeration and air-conditioning technology, there is a continuing search for replacement refrigerants for the CFC's. While alternatives have been discovered, they all appear to have undesirable characteristics. Aside from the thermodynamic and toxicity characteristics of a refrigerant, a key characteristic of conventional vapor-compression cycle refrigerants is that they must have a high density in the vapor phase so as to limit the physical dimensions of the conventional positive-displacement mechanical compressor. This requirement has been most favorably achieved with CFC's. However, if the conventional mechanical compressor were to be replaced by a compressor which is compatible with low-density refrigerants, then a whole range of environmentally friendly substances, including water, can be used as the refrigerant. The ejector-compressor is such a device. Rather than using motor driven mechanical elements to energize a fluid, and ejector-compressor utilizes momentum exchange through direct contact between a high-energy primary fluid and a lower energy secondary fluid to produce a mixed-fluid of intermediate energy. The use of an ejector-compressor in refrigeration is not new and the patent literature shows that it was well known at the turn of the 20$^{th}$ Century. Reverse Rankine-cycle refrigeration systems utilizing an ejector-compressor are termed in the art "ejector refrigeration" or, when water is used as the refrigerant, "steam-jet refrigeration". While environmentally friendly ejector refrigeration has been used widely in industrial applications where steam is abundant, it has not been adopted as the refrigeration system of choice for most domestic and commercial applications due to the low coefficient of performance (COP). Huang et al [Ref. 1] describes the operating characteristics and design of ejector refrigeration systems and shows that the coefficient of performance of the refrigeration cycle is directly related to the efficiency of the ejector, which is generally low for conventional ejectors. Al-Khalidy [Ref. 2] teaches the value of ejector refrigeration systems in utilizing solar energy and waste heat. He also shows the large discrepancy between the ideal level of performance of ejector refrigeration systems and the state-of-the-art. Both Huang et al [Ref. 1] and Al-Khalidy [Ref. 2] use CFC's in their ejector refrigeration systems, and Al-Khalidy teaches away from the use of water as a refrigerant primarily due to its tendency to freeze at 32° F. and the need to maintain the evaporator at a high vacuum. Neither reference addresses the issue of the damage to the environment incurred by the use of CFC's.

Garris (U.S. Pat. No. 5,647,221) discloses an ejector refrigeration system capable of much higher coefficients of performance than hitherto possible by virtue of the use of an ejector which operates on a different principle than conventional ejectors known as pressure-exchange, yet allows the use of low density refrigerants such as water.

Another application where high efficiency ejectors are badly needed is in power generation. In power cycles, whether Rankine cycles or Brayton cycles, it is commonly known that the higher the temperature of the working fluid at the inlet to the turbine, the higher the thermal efficiency. However, turbine-blade materials limitations make it impractical to run conventional engines at these higher temperatures. It has been discovered that a method for avoiding this limitation is by incorporating a topping cycle to the engine whereby the working fluid is elevated to a much higher temperature than would normally be permissible for entry into the turbine. Prior to entry into the turbine, the fluid does useful work in a compressor-device whose structure allows operation at much higher fluid temperatures than is possible with turbines. Subsequently, after performing sufficient work in said compressor-device and becoming partially de-energized to a level which is safe for introduction to the turbine, the fluid is passed to the turbine wherein it performs the required work. Clearly, the higher the thermal efficiency, the lower the greenhouse gas emissions for a given power output. Minardi et al (U.S. Pat. No. 4,439,988) discuss the importance to the nation of the implementation of a range of advanced technology concepts that promise very high efficiencies. Freedman et al [Ref. 6] explains how there has been a continuing effort to increase thermal power generation efficiencies by increasing the peak temperature of the cycle. He further explains how the combined effects of temperature, pressure, and dynamic forces on the cost and life of the plant impose temperature limitations.

The use of pressure-exchange devices for topping cycles in gas-turbine engines was discussed by Weatherston et al [Ref.3] and Welch et al [Ref. 4] and by Keller (U.S. Pat. No. 5,220,781). Although these references did not disclose the use of pressure-exchange ejectors, they did discuss the use of another pressure-exchange device Known as the "wave rotor" which offers improvements in performance by virtue of the capability of the device to operate in a high temperature environment and its ability to utilize pressure-exchange. Weatherston et al [Ref. 3] further teaches that for optimum efficiency of the pressure-exchange process, the speed of sound across the interface must be constant. Since normally the primary fluid is thermally energized in a combustor or a boiler, and the speed of sound in a gas varies as the square root of the ratio of gas temperature to molecular weight, if the primary fluid is of high temperature and the secondary fluid is of low temperature, in order to match the speed of sound, the secondary fluid must be of much lower molecular weight than the primary fluid. Hertzberg et al (U.S. Pat. No. 3,367,563) discusses the importance of using a lower molecular weight secondary fluid when the primary fluid is hot in pressure-exchange processes.

Decher [Ref. 5] describes the advantages of topping cycles in improving Rankine cycle efficiency and describes some prior art. Minardi et al (U.S. Pat. No. 4,439,988) disclose the use of ejectors in a topping cycle in order to improve the efficiency of Rankine cycle power generation. In their disclosure, they emphasize that conventional ejectors are normally considered inefficient devices and that in order to improve cycle thermal efficiencies, ejectors must be operated under conditions where high ejector efficiencies are possible. They teach that when the energetic primary flow is of high molecular weight and the secondary flow is low molecular weight, it is possible to meet two criteria discovered at Wright-Patterson Air Force Base under which even conventional ejectors can demonstrate high ejector efficiency. These conditions were that both primary and secondary flows should have nearly equal speed during mixing, and the Mach number of the secondary flow should be less than one (subsonic). Freedman (U.S. Pat. No. 4,843,823) and Freedman et al [Ref. 6] disclosed another mechanism whereby the use of ejectors in topping cycles are used to enhance the thermal efficiency of Rankine power cycles. Freedman et al [Ref. 6] states: "Although ejectors have relatively low efficiencies, the ejector-based topping cycles may have an overall higher efficiency than that of the above-described current turbine-bases topping cycles, because of two major advantages: (1) The ejector can tolerate higher temperatures than a turbine can, and (2) it could use working fluids that have thermo-physical properties superior to those that can be used in turbine topping cycles." As did Weatherston et al [Ref. 3] and Minardi et al (U.S. Pat. No. 4,439,988), Freedman (U.S. Pat. No. 4,843, 823) teaches the use of two different working fluids in his disclosure whereby the primary fluid is of higher molecular weight than the secondary fluid. Freedman et al [Ref. 6] proposed the use of sodium for the primary fluid and helium for the secondary fluid. Minardi et al (U.S. Pat. No. 4,439, 988) suggested several combinations including mercury-hydrogen, and water-hydrogen as the respective primary and secondary fluids.

In FIG. 10 is shown a conventional ejector, well known in the prior art. This pumping device has the advantage of extreme simplicity, there being no moving parts. The principle of operation is that the high energy primary fluid entering the ejector through primary fluid inlet conduit 2, passes through a supersonic nozzle 5, and emerges therefrom as a high speed jet. Upon exiting said supersonic nozzle, the primary jet entrains secondary fluid introduced through secondary fluid inlet conduit 3 into plenum 24 through the action of turbulent mixing between primary and secondary fluid. The mixing and subsequent diffusion is controlled by aerodynamic shroud 10 and the mixed flow is discharged from the ejector at mixed-fluid outlet conduit 4. The conventional ejector, as a result of its simplicity, finds application in numerous technologies. Nevertheless, it suffers from low efficiency as a result of the inherent irreversibility of the mechanism with which it operates: turbulent mixing. Despite a century of research on improving this device, its performance is limited by the nature of the physics of its operation.

Foa (U.S. Pat. No. 3,046,732) and Garris (U.S. Pat. No. 5,647,221) disclosed new types of ejectors which operate on a different principle from conventional ejectors: pressure-exchange. Due to the reversible nature of pressure-exchange, much higher efficiencies can be obtained, thereby making possible a new level of performance. Foa (U.S. Pat. No. 3,046,732) and Garris (U.S. Pat. No. 5,647,221) have discussed the fact that pressure-exchange is a different process which is thermodynamically reversible because it is based on the work of interface pressure forces as opposed to turbulent mixing. They further disclosed ejectors which utilize both the pressure-exchange mechanism in addition to the turbulent mixing mechanism.

A figure of merit on ejector performance is provided by comparing the performance of an ejector with the ideal turbo-machinery analog of an ejector. In the turbo-machinery analog, a turbine directly drives a compressor, the turbine being energized by a high pressure primary fluid, and the compressor taking suction from a source of secondary fluid which is to be energized, both compressor and turbine discharging into a common exit passage. If the processes occurring in the turbo-machinery are assumed to occur isentropically and reversibly, the adiabatic efficiency obtained is optimal. Since real conventional ejectors depend on irreversible processes, their adiabatic efficiencies are a small fraction of the turbo-machinery analog.

The concept of using turbo-machinery in place of ejectors to improve efficiency is known in the art. This is termed the "turbo-machinery analog". Rice et al (U.S. Pat. No. 3,259, 176) disclosed the use of the turbo-machinery analog in a refrigeration system which is equivalent to an ejector refrigeration system but with the ejector replaced by the turbo-machinery analog. However, the advantage of the conventional ejector is its simplicity. The conventional ejector has no moving parts, whereas, equivalent turbo-machinery requires a high precision product using advanced materials, and which is very costly. Utilizing the turbo-machinery analog in refrigeration applications would require very large and costly machinery if low density refrigerants were used. Furthermore, topping cycles utilizing the turbo-machinery analog would not be able to handle the high temperature working fluids better than standard turbo-machinery. Hence, for these applications, the turbo-machinery analog would not be adequate. An objective of the present invention is to provide an ejector which satisfies the need for high efficiency through the use of pressure-exchange, approaching the efficiency of the turbo-machinery analog, yet which retains much of the simplicity of the conventional ejector.

Foa (U.S. Pat. No. 3,046,732) invented an ejector which utilized the benefits of pressure exchange through the use of rotating primary jets. He further showed how the rotating primary jets, when incorporated into a rotor, could be made self-actuating by means of canting the nozzles at an angle with respect to the azimuthal plane. Garris (U.S. Pat. No. 5,647,221) taught how when the working fluid was compressible, shock and expansion wave patterns could be used to advantage in effecting flow induction by pressure-exchange. Garris (U.S. Pat. No. 5,647,221) further taught how pressure-exchange ejectors might effectively be utilized in ejector refrigeration. While these prior art devices offer effective aerodynamic means to provide excellent use of pressure-exchange to affect flow induction, they are deficient in that they require a very high degree of precision in manufacturing to provide the level of sealing necessary while allowing the rotor to spin at the high angular velocities necessary to achieve effective pressure-exchange. Furthermore, in these prior-art pressure-exchange ejectors, the demands on the rotor thrust-bearing are very high due to the high internal supply pressure and the low external suction pressure occurring simultaneously with very high rotor angular velocities. This very demanding combination of requirements for sealing, high rotational speeds, and thrust bearing tend to substantially increase the cost of the device and reduce its potential service life. It is therefore the principal objective of the present invention to provide an ejector which effectively exploits pressure-exchange for flow induction, yet is less demanding with regard to sealing, thrust management, and high rotational speeds. Another objective of the present invention is to provide a pressure-exchange ejector which is simple and economical to manufacture. Still another objective of the present invention is to provide a pressure-exchange ejector which is suitable for ejector refrigeration applications and power generation topping-cycle use for both gas turbines and Rankine cycle systems.

After many years of attempts to break the sound barrier, Chuck Yeager in his Bell X-1 aircraft succeeded on Oct. 14, 1947 at achieving Mach 1.06. By 1967, the Lockheed SR-71 Blackbird was in service and flying at sustained speeds exceeding Mach 3.0, while the North American X-15 flew at Mach 7.0 that same year. This rapid advance in high speed aeronautics technology was due to the realization that optimal design for supersonic compressible flow was radically different than that for subsonic flow. While the application of the design principles of supersonic compressible flow are now in common usage in aerospace applications, they have not been effectively applied to pressure-exchange ejectors. An objective of the present invention is to advantageously utilize these principles so as to provide a pressure-exchange ejector which overcomes the aforementioned shortcomings of the prior art.

SUMMARY OF INVENTION

In the development of new technologies which will enable us to continue to enjoy our prosperity yet preserve the environment, there has been a profound need for high efficiency ejectors in three areas:

1. Refrigeration/air conditioning.
2. Gas Turbine engines.
3. Rankine Cycle engines.

These areas of technology are responsible for a very high percentage of the energy we consume and the pollution we create, particularly with regard to greenhouse gases and ozone layer depleting chemicals. Progress in beneficially utilizing ejectors has been hampered by their inherently low efficiency due to the fundamental operating mechanism of turbulent entrainment in the case of conventional ejectors, or by difficulties in mechanical design under the combined requirements of high thrust—high angular velocity—efficient sealing for the case of prior art pressure exchange ejectors.

The present invention provides a pressure-exchange ejector capable of substantially higher efficiencies than hitherto possible with conventional ejectors. However, by the use of the principles of supersonic aerodynamics, the mechanical complexity of the prior art pressure-exchange ejectors is reduced, and the demands for sealing and thrust management are significantly assuaged. As a result of the lower stresses and the avoidance of sealing, the pressure-exchange ejector provided herein is capable of operating at extremely high temperatures.

In the instant invention, a primary-fluid comprising a compressible gas or vapor at a high stagnation pressure is introduced through suitable piping to a housing at the location of a primary-fluid inlet conduit. Said primary-fluid is then conducted to a supersonic nozzle whereby it is accelerated to supersonic speeds. As a result of the acceleration, the static pressure of the primary fluid at the discharge of the nozzle is substantially reduced. The primary flow will then impinge upon canted vanes fixedly attached to a free-spinning rotor, thereby causing the rotor to spin at a high rotational speed. Over the wedge-shaped vanes, oblique shock structure will form, creating a series of expansion fans and compression waves which will force the secondary fluid to expand into the interstices between the peripherally spaced oblique vane-shock structures. A secondary-fluid is introduced to the said housing through suitable piping and then conducted to the vicinity of the nozzle discharge. An aerodynamic shroud further directs the secondary fluid into the vicinity of the rotor vanes and associated shock and expansion fan structure. Momentum will be exchanged between the primary-fluid and the secondary-fluid at the interfaces between said primary fluid and said secondary fluid through pressure exchange. After pressure-exchange occurs, the primary and secondary fluid are mixed and diffused to subsonic speeds before being transported to the mixed-fluid outlet conduit. At the discharge, the specific energy, and stagnation pressure, of the mixed discharge flow will be greater than that of the secondary flow, but less than that of the primary flow. This energized and compressed fluid may now be used for its intended application.

A prime advantage of the supersonic flow design of this invention is that the complex rotational seals between the primary and secondary flows that are required in the prior art pressure-exchange ejectors are not needed, so that the instant pressure-exchange ejector is not sensitive to the effects of the thermal or centrifugal expansion of the rotor. Furthermore, it should be noted that in this invention, the flow over the surface of the rotor remains supersonic, hence the static pressure on the surface of the rotor is relatively low. This provides a substantial benefit in reducing the axial thrust load on the rotor, which, again, simplifies the manufacture, increases the service life, and reduces the cost. This invention permits the use of an abundant selection of materials and manufacturing methods for the fabrication of the various components. The most critical component is the rotor where centrifugal stresses and dynamic balance must be taken into account. Satisfactory rotors can be fabricated by CNC machining, casting, injection molding, powder metallurgy techniques, 3-D printing, and other methods. The supersonic design of the pressure-exchange ejector herein disclosed greatly simplifies the manufacture of the ejector, increases the service life, and reduces the cost.

The instant disclosure provides an ejector refrigeration system utilizing the novel pressure-exchange ejector of this invention in a manner which enables the use of environmentally friendly refrigerants such as water and which enables the refrigeration system to be directly energized by non-polluting energy sources such as solar energy, natural gas, and waste heat.

This disclosure further provides a gas turbine engine which, by the use of the novel pressure-exchange ejector of this invention, is capable of providing higher efficiency and lower greenhouse gas emissions while producing equal power. This invention achieves this improved efficiency through the use of a topping cycle which enables the system exploit the ability of the instant pressure-exchange ejector to convert thermal energy into useful work at extreme temperatures, and deliver to a conventional turbine partially de-energized gases at temperatures within the materials limitations of turbine blades.

The disclosure further provides a Rankine cycle engine which, by the use of the novel pressure-exchange ejector of this invention, is capable of providing higher efficiency and lower greenhouse gas emissions than possible with current technology at the same power output levels. This system achieves its improved efficiency by virtue of a topping cycle utilizing a first and a second working fluid, the first being brought to a temperature in substantial excess of that used in current technology and supplied to the primary fluid inlet of the pressure exchange ejector. The second working fluid is a non-condensing gas and is brought to the secondary fluid inlet conduit in the pressure-exchange ejector wherein the high temperature primary fluid is partially de-energized by performing useful work on the secondary fluid, and the mixed fluid discharging from the pressure-exchange ejector is introduced to a turbine which further de-energizes the fluid an produces work output. Another embodiment of this invention is provided whereby the thermal energy not converted to mechanical power in the turbine is used for a second adjunct Rankine power cycle.

BRIEF DESCRIPTION OF THE DRAWINGS

FIG. 14 is a sectional transverse view of a third embodiment of the invention whereby the pressure exchange and diffusion occur in a radial configuration and axial thrust is eliminated by symmetric pressure balancing.

FIG. 15 is a blow-up of the interaction zone in the vicinity of the rotor of FIG. 14 which shows the radial supersonic nozzles and the secondary flow paths.

FIG. 16 shows and external view of the embodiment of FIG. 14.

FIG. 17 shows a perspective view of a typical rotor as would be used in the embodiment of FIG. 14.

DESCRIPTION OF THE PREFERRED EMBODIMENTS

Figure 1:
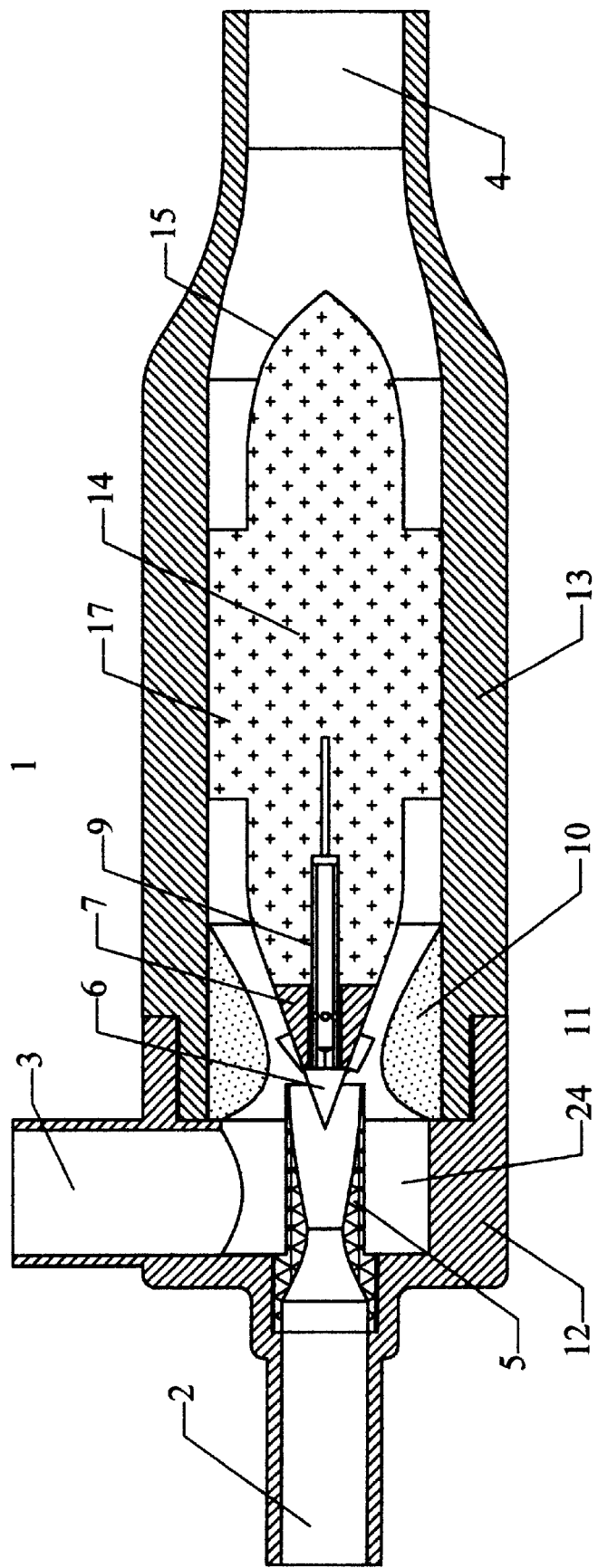
FIG. 1 is a longitudinal sectional elevation of an embodiment of the invention placing the rotor between an upstream conical fore-body and a downstream spindle.
Figure 2:
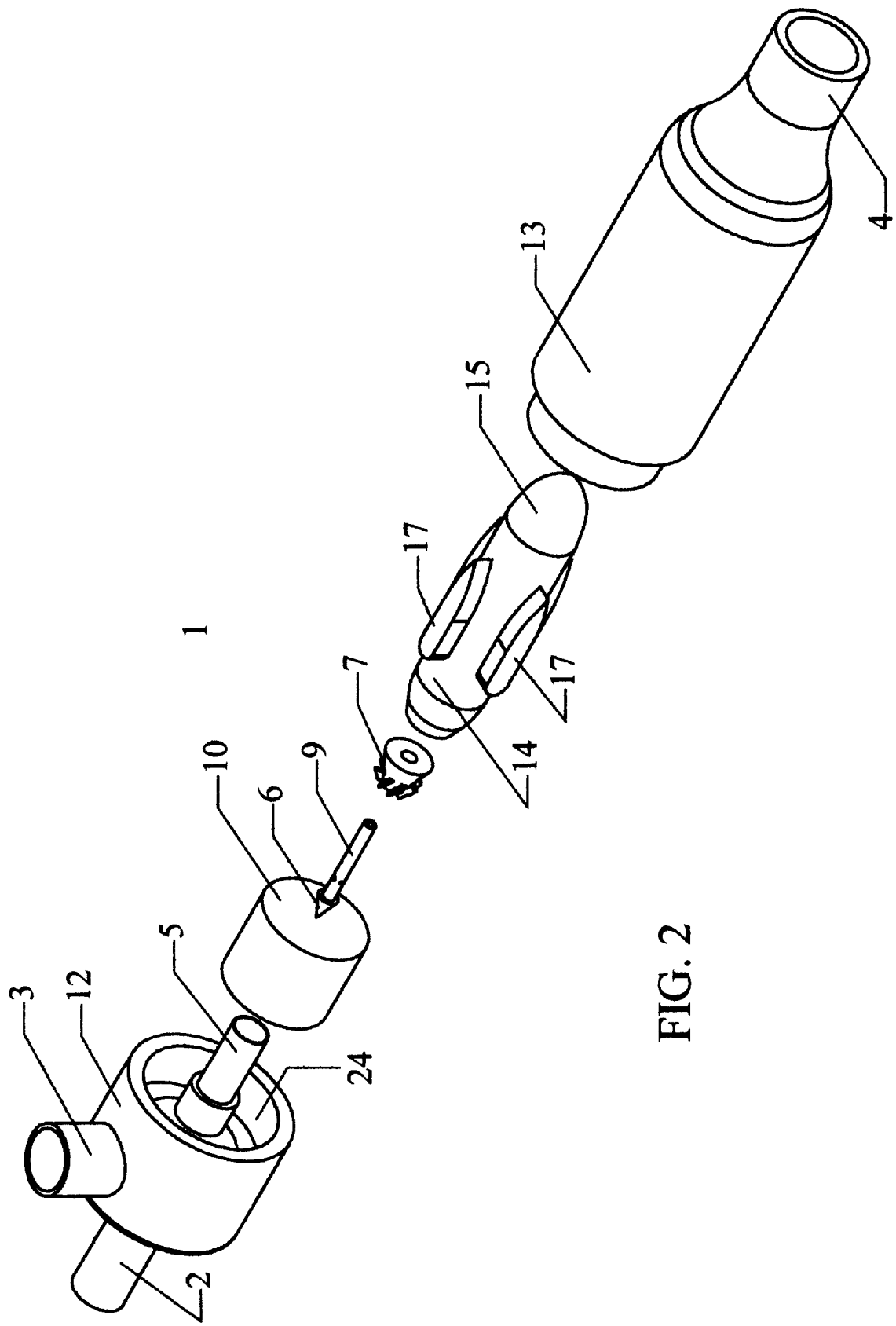
FIG. 2 is an exploded view of the embodiment of FIG. 1 showing each component.
Figure 5:
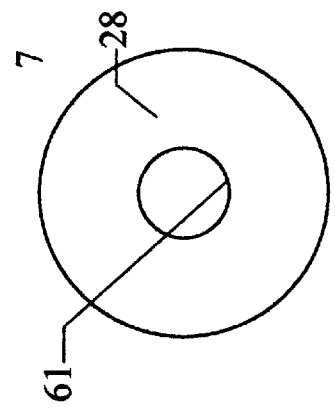
FIG. 5 is a rear view of the same rotor shown in FIG. 3.
Figure 4:
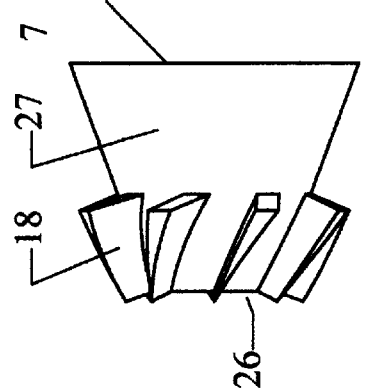
FIG. 4 is a side view of the same rotor shown in FIG. 3.
Figure 6:
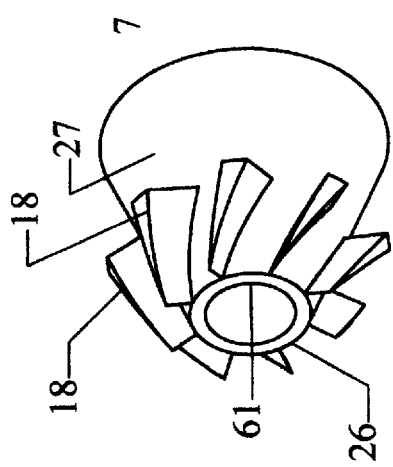
FIG. 6 is angular projection of the same rotor shown in FIG. 3.
Figure 3:
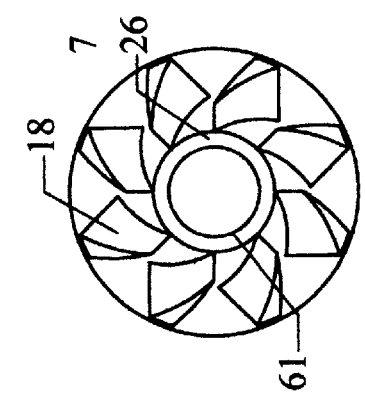
FIG. 3 is a front view of a representative rotor in accordance with the embodiment of FIG. 1.
Figure 7:
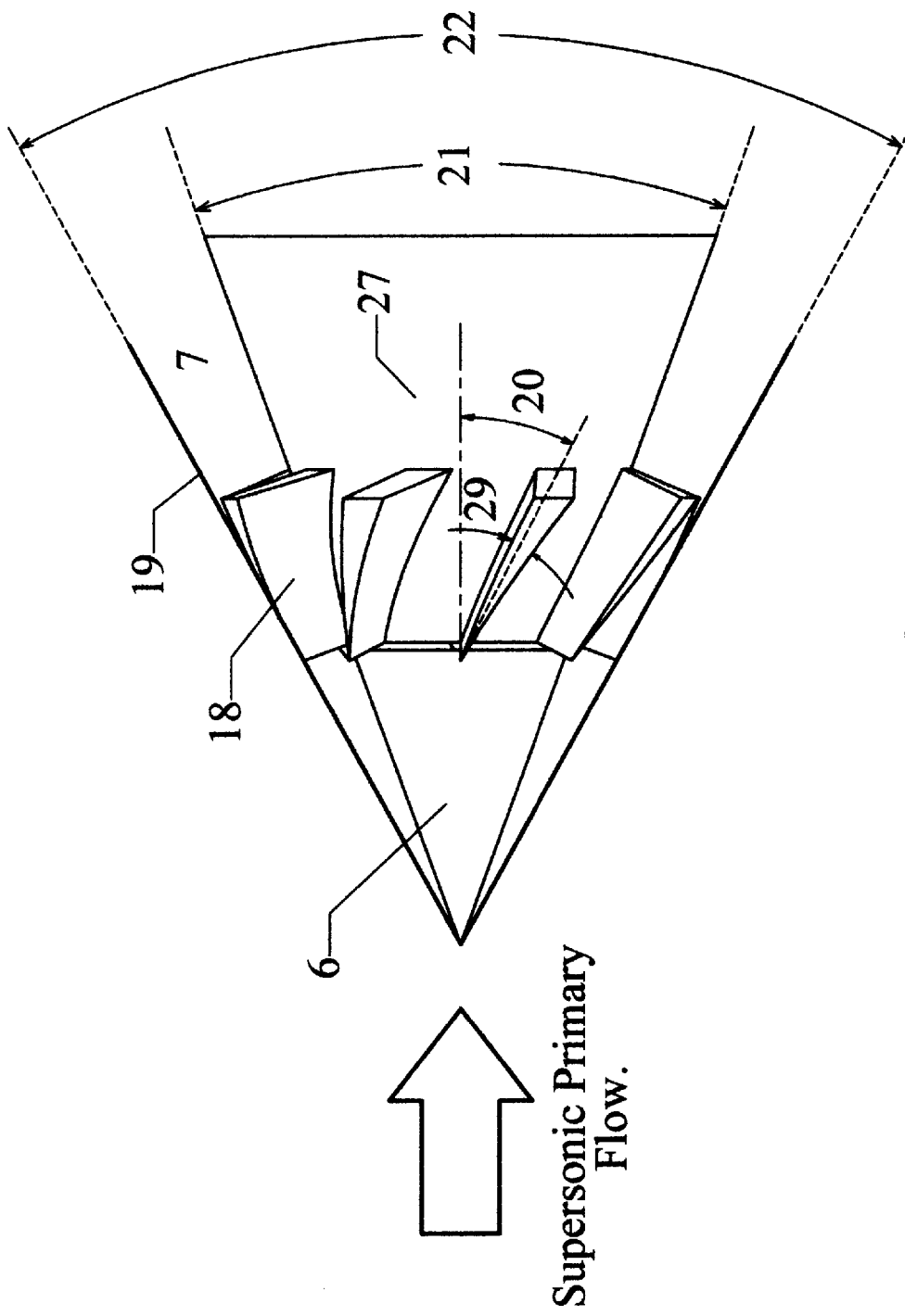
FIG. 7 shows a fore-body cone and a typical rotor with a fore-body shock wave illustrating the geometrical relationships for the embodiment of FIG. 1.
Figure 8:
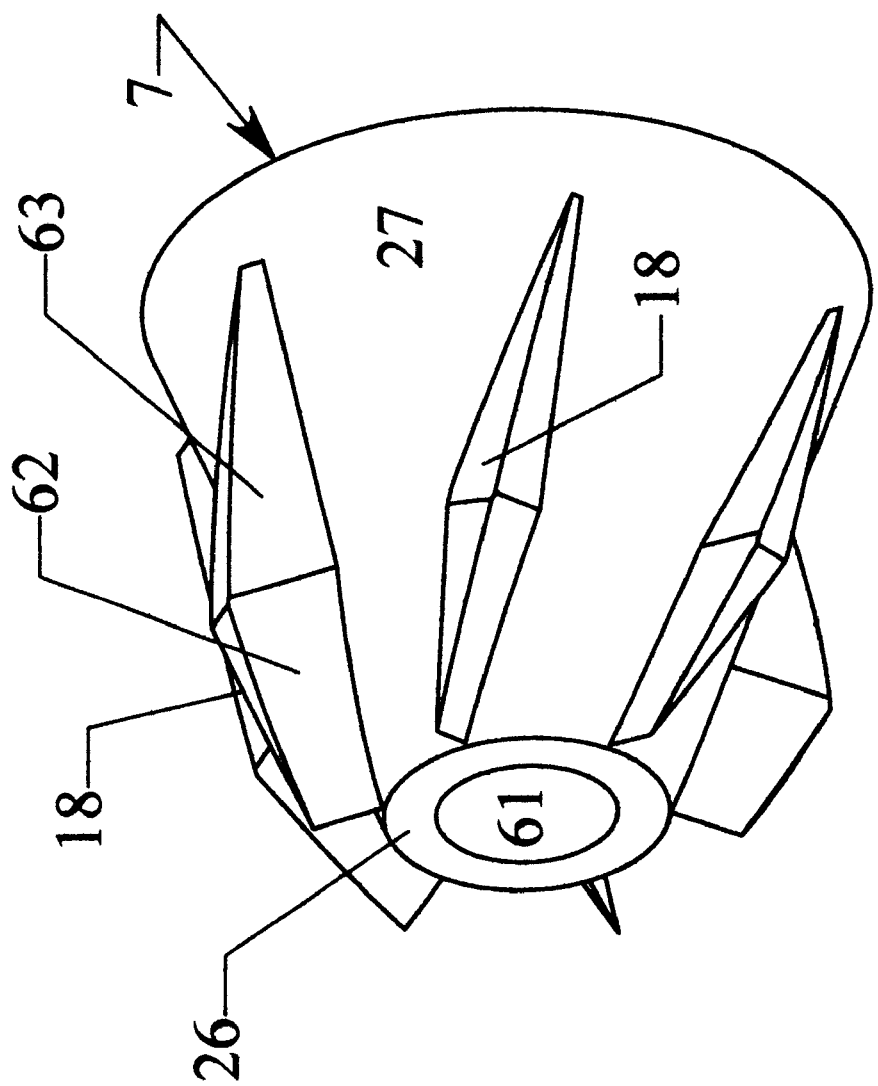
FIG. 8 shows a configuration of the rotor design for the embodiment of FIG. 1 incorporating a tapered trailing surface to control the expansion process.
Figure 9:
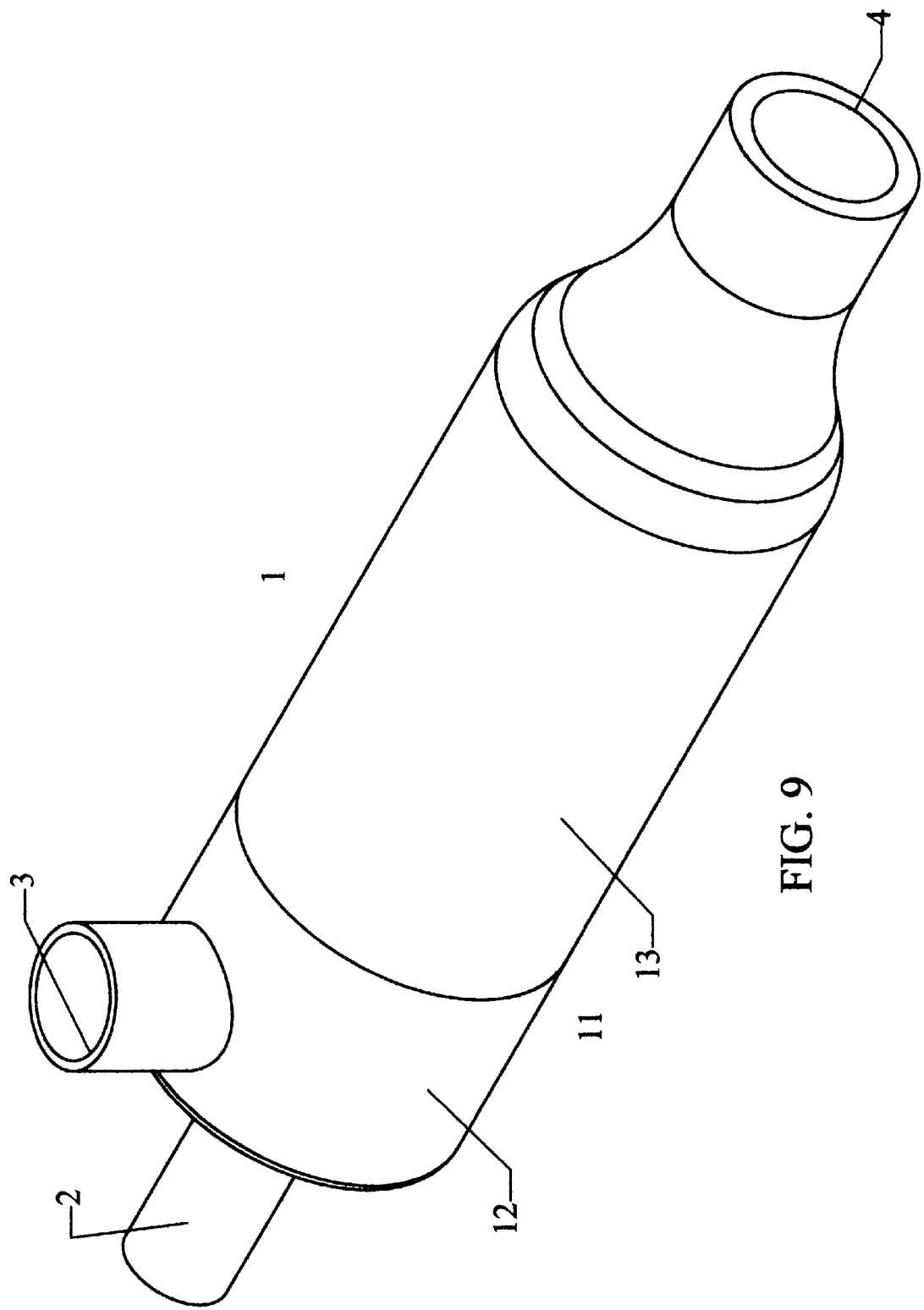
FIG. 9 shows an isometric projection of an external view of the assembled invention for the embodiment of FIG. 1.
Figure 10:
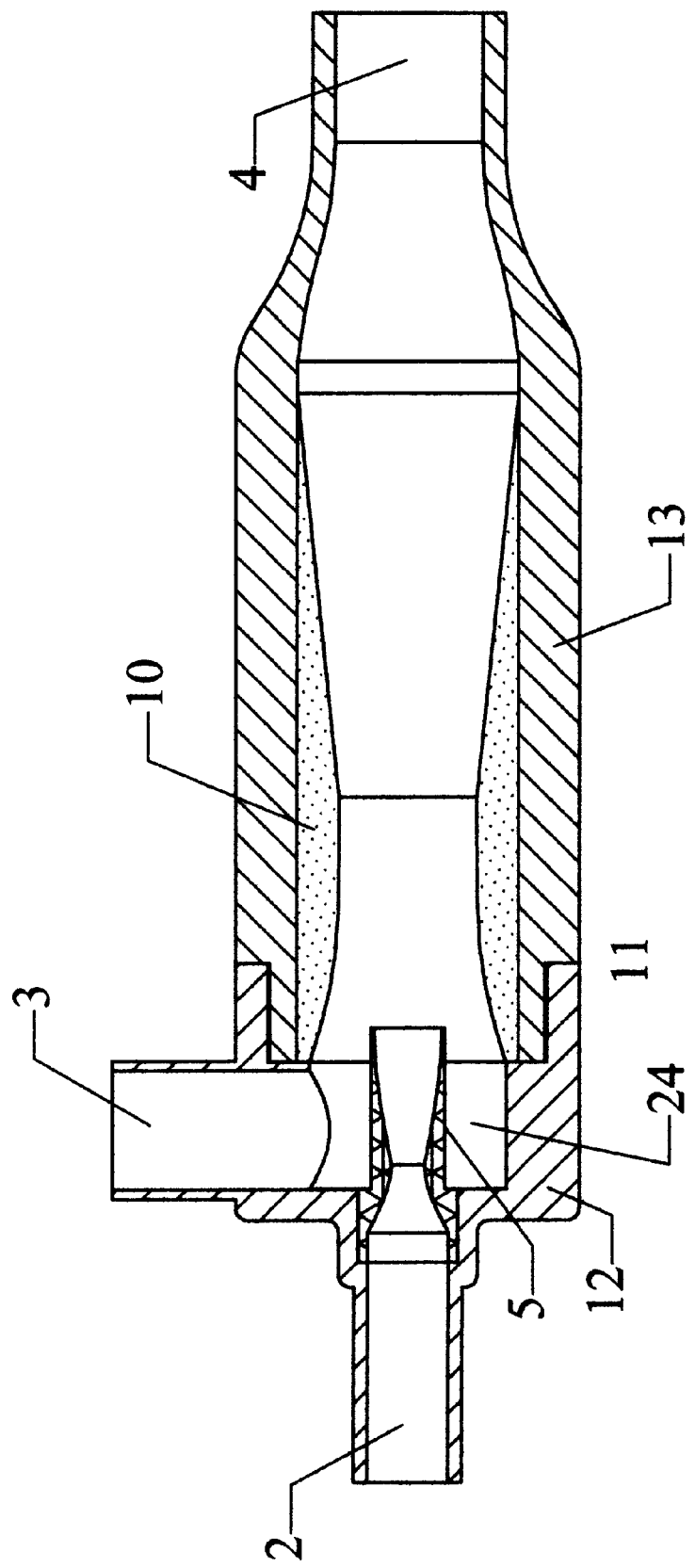
FIG. 10 shows a longitudinal sectional elevation of a conventional ejector.
Figure 21:
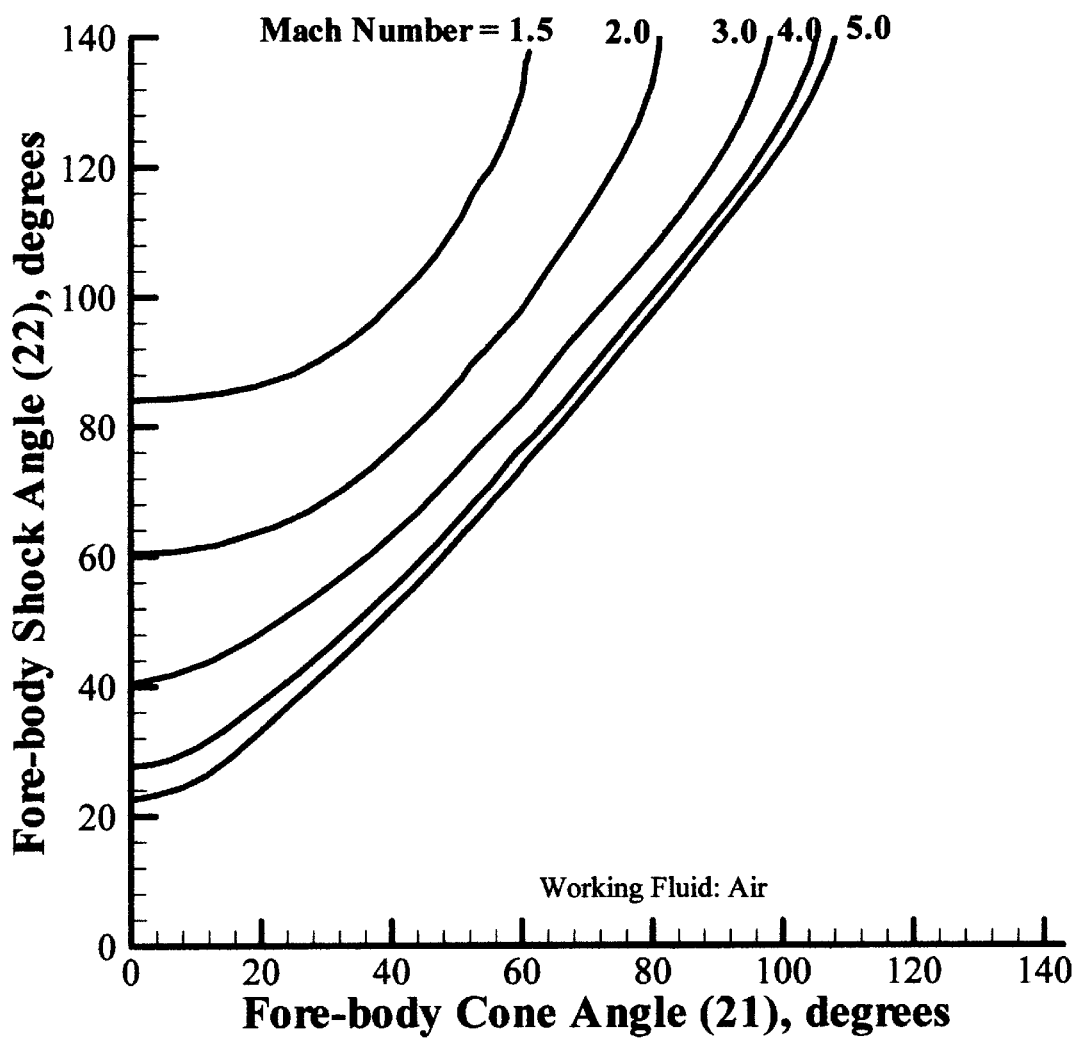
FIG. 21 shows the relationship between the fore-body cone angle and the angle of the attached fore-body shock for various upstream Mach numbers and for air.

A preferred embodiment of the novel pressure-exchange ejector disclosed herein is shown in a longitudinal sectional elevation in FIG. 1, in an exploded view in FIG. 2, and in an external assembly view in FIG. 9. Ejector 1 is enclosed by a housing 11 which is shown consisting of an upstream section 12 and a downstream section 13 which are connected in a manner so as to provide structural rigidity and sealing, as would be provided by a threaded connection among other common methods, yet permit separation of said upstream and downstream sections in a manner convenient for assembly and disassembly. Said upstream section 12 provides a primary fluid inlet conduit 2 and a secondary fluid inlet conduit 3, a rigid support for supersonic nozzle 5, and a secondary fluid plenum 24. Said downstream section of the housing 13 provides rigid support for aerodynamic shrouds 10, rigid mount for the spindle 14, and an outlet conduit 4 for the mixed fluid. A compressible energetic primary fluid is introduced through said inlet conduit 2 and directed to converging-diverging supersonic nozzle 5 whereby the primary fluid is accelerated to supersonic speeds. It is known that when the stagnation pressure upstream of a converging-diverging supersonic nozzle is above a certain critical value, the Mach number of the compressible fluid discharging from the nozzle is determined by the thermophysical properties of the working fluid and the ratio of the exit area to the throat area of said supersonic nozzle 5. When the working fluid is air, the supersonic nozzle 5 shown in FIG. 1 is a Mach 3.0 nozzle. However, a designer skilled in the art might select a nozzle of higher or lower Mach number depending on his/her design objectives. The less energetic secondary fluid is introduced through inlet conduit 3, passing through a plenum 24 which distributes the secondary fluid in an axi-symmetric manner around the exterior of supersonic nozzle 5 prior to being conducted downstream for pressure-exchange with the primary fluid. The supersonic primary fluid emanating from the exit of supersonic nozzle 5 impinges upon a fore-body 6 in such a manner that an attached conically-shaped oblique fore-body shock wave 19 forms at the apex of said fore-body 6 as seen in FIG. 7. In accordance with FIG. 21, the angle 22 of the fore-body shock 19 is a function of the Mach number of said primary fluid exiting from said supersonic nozzle 5, the thermophysical properties of said fluid, and the fore-body cone angle 21. The cone angle 21 is selected to be small enough to insure that the fore-body shock 19 is weak and is attached to the apex of said fore-body 6. Since the fore-body shock 19 is weak, the flow behind said fore-body shock 19 is preferably supersonic, although at a lower Mach number than the fluid upstream of said fore-body shock 19, and is forced to change direction so as to follow the contour of the fore-body 6. Immediately downstream of the fore-body 6 is a rotor 7 which is pivotally mounted so as to enable it to freely spin about the longitudinal axis of shaft 9. In the preferred embodiment, the fore-body 6 is rigidly connected to the shaft 9 which is stationary with respect to the housing 11. This minimizes the inertia of the rotating components. However, in other embodiments of this invention, the fore-body 6 may be attached to or integral with the rotor and accordingly rotate in unison about their common central axis. In the preferred embodiment shown, the shaft 9 is rigidly connected to the spindle 14 and the fore-body cone 6 while the rotor is pivotally connected to the shaft 9. In other embodiments of this invention, the shaft 9 may be rigidly connected to the rotor 7 and cone 6, but pivotally connected to said spindle 14. As seen in FIGS. 3, 4, 5, 6, 7, and 8 in the preferred embodiments, the body of the rotor 7 has the shape of the frustum of a cone whose included angle is equal to that of the fore-body 6 and whose conical surface is approximately contiguous with that of the adjacent fore-body 6 so as to provide a smooth transitional flow path as the fluid progresses from the vicinity of the fore-body 6 to the vicinity of the rotor. Upon the conical surface of the rotor 27, a plurality of wedge-shaped vanes 18 are fixedly attached axi-symmetrically about the central longitudinal axis of rotor 7. The number of vanes 18 utilized can vary from two to a multitude, the number being determined by the pressure rise and mass flow ratio desired from the pressure-exchange ejector 1, as well as the diameter of the rotor 7. In FIG. 7 are shown the geometrical attributes of the vanes 18, the fore-body cone 6 and the conical surface of the rotor 27 in relation with the fore-body shock 19. It is noted that in the preferred embodiment, the vanes 18 have a sharp leading edge and are characterized by a small wedge-angle 29. Furthermore, in the preferred embodiment shown in FIG. 7, in order to avoid the generation of unnecessary losses through a "paddling effect" resulting from the vanes 18 extending outside of the fore-body shock 19, the outer edges of the vanes 18, henceforth referred to as the vane tips, extend radially in such a manner so as to approximately correspond to the extended location of the fore-body shock 19. In FIGS. 3, 4, 6, 7, and 8 it is seen that the vanes 18 are canted at a spin-angle 20 with respect to the longitudinal plane. One skilled in the art would select a spin-angle 20, generally between 5° and 45°, depending on the design requirements of the pressure-exchange ejector 1. In the embodiment shown, the spin-angle 20 is 10° and the wedge-angle 29 is 5°. When the supersonic fluid stream passes over said canted vanes 18, free-spinning rotation is imparted to the rotor 7. The rotational speed that the rotor acquires is dependent upon the thermo-physical properties of the fluid, the Mach number of the fluid emanating from supersonic nozzle 5, the included angle 21 of the fore-body cone 6, and the spin-angle 20 of the vanes 18. The presence of undesirable friction will reduce the rotational speed of the rotor 7 from that of the ideal free-spinning condition. When the supersonic fluid behind the fore-body shock 19 and in the vicinity of the fore-body cone 6 contacts the leading edge of a vane 18, a weak oblique vane-shock will form. To minimize shock losses yet maintain structural integrity, the wedge-angle 29 is generally between 5° and 30°. The vane-shocks from adjacent vanes 18 will intersect and reflect from each other. In the preferred embodiment, so as to minimize losses from shock reflections, the chord-length of each of the vanes 18 should be limited so that the reflected vane-shocks, as well as fore-body shock 19 reflections from the primary-secondary interface, do not impinge on the vane 18. At the rear of each vane 18, a 3-dimensional expansion fan will develop. This expansion will draw secondary fluid down into the interstices behind the vanes 18 and initiate the pressure-exchange process between primary and secondary flows. In the preferred embodiment, the trailing surfaces of the vanes 18 are approximately perpendicular to the rotor body. However, this is not critical to the performance of the pressure-exchange ejector 1, and embodiments with forward or reverse sweep are anticipated by this invention. Furthermore, one skilled in the art might choose to better control the expansion fans behind the vane 18 by shaping the trailing edge into an aerodynamic form such as an inverted wedge, as shown in FIG. 8 where said vanes 18 have a leading surface 62 and a trailing surface 63.

As seen in FIG. 1, the aerodynamic surfaces of an aerodynamic shroud 10, said spindle 14, and said housing 11 control four essential sequential processes: i. The direction and acceleration of the secondary fluid from the plenum 24 into the interaction zone in the vicinity of the rotor 7 and the vanes 18; ii. The pressure-exchange process which occurs in the region immediately downstream of the vanes 18; iii. The mixing process of primary and secondary fluids; and, iv. The deceleration and diffusion of the mixed flow. In other embodiments of this invention, one skilled in the art could accomplish these said four functions by employing a plurality of strategically placed aerodynamic shrouds 10.

The rotor 7 has an axial bore 61 to provide a pivotal mount on a shaft 9 which is supported by the upstream end of a spindle 14. In the preferred embodiment, the non-rotating spindle 14 is shaped aerodynamically so as to cooperate with the shroud 10 in managing pressure-exchange, mixing, and diffusion processes. Since the supersonic flow over the surfaces 27 of the rotor 7 will incur axial loading in the downstream direction, a thrust-bearing means must be introduced to avoid mechanical contact, and consequent friction, between the rotating rotor 7 and the non-rotating spindle 14.

As best seen in FIGS. 1 and 2, in this embodiment, the spindle 14 is rigidly and concentrically connected to the downstream section 13 of housing 11 by means of a plurality of struts 17 which radially extend from the substantially cylindrical body of said spindle 14 to the inner surface of said downstream housing section 13. The struts 17 are preferably aerodynamically shaped to minimize stagnation pressure losses in the flow of the fluid mixture around them, yet they must be wide and long enough and of sufficient number to provide a strong and rigid support for the spindle 14. A minimum of three struts is recommended, but one skilled in the art might require a greater number so as to provide the additional function of flow straightening. In the preferred embodiment shown, four struts were selected. Referring to FIG. 1, downstream of the struts 17, and integral with the rear portion of the spindle 14 is shown an aerodynamic diffuser 15 which, in cooperation with the aerodynamic surfaces of the housing downstream section 13, serves to further decelerate the mixed fluid in a gradual manner so as to minimize stagnation pressure losses. In this particular embodiment, the aerodynamic diffuser 15 assumes the form of an afterbody to spindle 14. Further downstream of the aerodynamic diffuser 15 is the mixed-fluid outlet conduit 4 from the rear portion of the housing downstream section 13. From said mixed-fluid outlet conduit 4, the compressed mixture discharges and is directed by suitable piping to its intended recipient application.

Important features of the disclosed pressure-exchange ejector 1 include the fact that no complicated dynamic seals are necessary to separate the primary and secondary flows prior to pressure-exchange as is required in the prior art. Secondly, since the flow is supersonic over the surface 27 of the rotor 7, the static pressure is low, and the thrust loading is substantially lower than that experienced in the prior-art pressure-exchange ejectors. Thirdly, since the rotor 7 is free-spinning, the stress on the vanes 18 is very low relative to turbine vanes which must transmit substantial torque. This allows the rotor 7 to be made from ultra-high temperature materials which can sustain very high temperature primary fluids introduced through inlet conduit 2. Since for many applications the primary of the pressure-exchange ejector 1 is a thermally energized fluid introduced through inlet conduit 2, the secondary, introduced through inlet conduit 3, would normally be at a much lower temperature. After the primary and secondary fluids experience pressure-exchange, the combined fluid temperature would be considerably lower than that of the primary. Hence, one skilled in the art could design this invention such that the shroud 10, the spindle 14, and all downstream components of the ejector 1 could be reduced to a temperature substantially lower than that of the primary. Fourthly, since no radial sealing surfaces are needed, the difficulties of prior art pressure-exchange ejectors in designing for the effects of thermal and centrifugal expansion of the rotor 7 are not encountered in the instant pressure-exchange ejector 1. Fifthly, the invention can function very well with different working substances for the primary and secondary fluids. For example, some topping cycles call for a primary fluid of vaporized liquid metal and secondary fluid of helium. Later in the cycle, the different working fluids can easily be separated by selective condensation."

Figure 11:
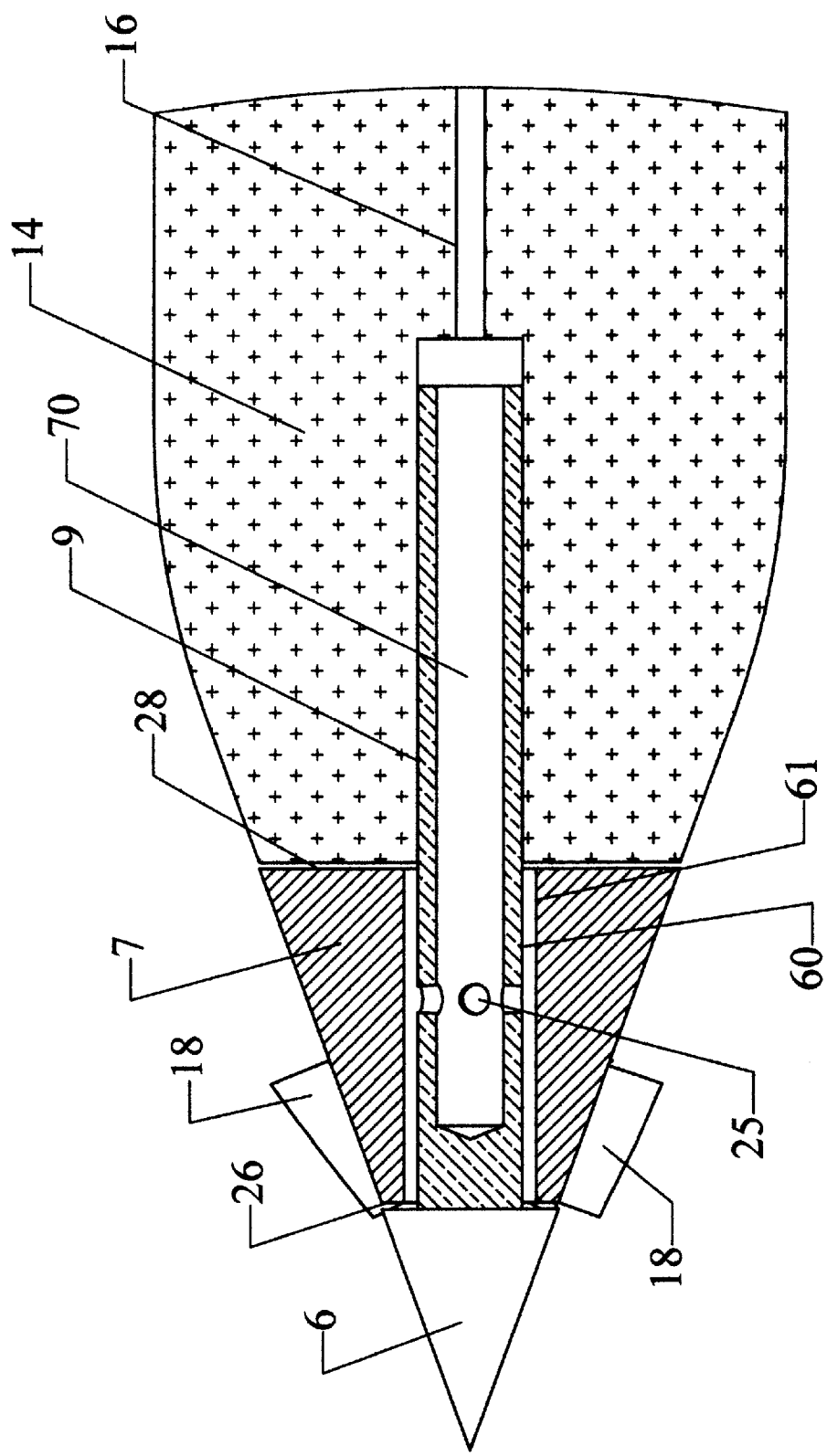
FIG. 11 shows a fluid radial bearing and thrust bearing arrangement for the embodiment of FIG. 1.

As a result of the supersonic primary fluid emanating from supersonic nozzle 5 and impinging on the rotor 7, a thrust loading in the axial downstream direction is placed on the rotor 7, which would tend to produce contact between rotor 7 and adjacent components if no thrust bearing means were employed. For the embodiment shown in FIGS. 1 and 2, the adjacent components would be the fore-body 6 and the spindle 14. For other embodiments, adjacent components might include bearings, afterbodies, spacers, shims, and similar mechanical components. Since for most efficient operation of the ejector, the rotor 7 should be substantially free-spinning, a thrust bearing is needed to provide a longitudinal clearance space between said rotor 7 and said spindle 14 and thereby minimize friction between them. There are several ways in which this could be accomplished. In one embodiment, angular contact ball bearings could be placed at the forward and rearward ends of rotor 7 such that the outer races of said bearings are captured by said rotor 7, while the inner races are fixed at appropriate positions on the shaft 9 so that longitudinal forces on the rotor 7 are transmitted through the bearings to the shaft 9 and then to the spindle 14. Still another embodiment would provide a pivotal mount of the rotor 7 on shaft 9 while a needle roller thrust bearing is placed between rotor 7 and spindle 9. In this embodiment, the longitudinal thrust imposed on rotor 7 is directly transferred to the spindle 14 through the intermediate needle roller thrust bearing. Still another embodiment would employ magnetic radial and thrust bearings to provide of a substantially frictionless pivotal connection between said rotor 7 and said spindle 14. One skilled in the art could apply variations on these embodiments to provide effective radial and thrust bearing means. Still another embodiment of a radial and thrust bearing for use in this invention is shown in FIG. 11 which employs both fluid thrust and radial bearings. This mode is considered the best for applications where the rotor is small and must be compact since the fluid bearings occupy very little space, and, for high temperature applications, the bearing fluid provides the additional function of cooling. In order to elucidate the operation of the invention, the bearing clearances shown in FIG. 11 are exaggerated. As seen in FIG. 11, shaft 9 is provided a concentrical bore 70 so as to allow the entry of bearing fluid which is provided through supply conduit 16. At a longitudinal location on said shaft 9 corresponding to a location between the upstream end 26 and downstream end 28 of rotor 7, a plurality of substantially radial apertures 25 are provided in the shaft 9 which provide flow passages for said bearing fluid between the concentric bore 70 and the periphery 60 of said shaft 9. The apertures are arranged axi-symmetrically so as to evenly distribute the bearing fluid around the periphery 60 of said shaft 9. A small radial clearance is provided between the periphery 60 of shaft 9 and the axial bore 61 of rotor 7, and the longitudinal movement of the rotor 7 is limited in the downstream direction by the spindle 14, and in the upstream direction by the fore-body cone 6, but is otherwise free to slide along as well as rotate about the shaft 9. The distance between the rear surface of fore-body cone 6 and the front surface of spindle 14 is greater than the longitudinal dimension of the rotor 7 by a small but positive amount so as to allow small clearances between the upstream end 26 of rotor 7 and the fore-body cone 6 and between the downstream end 28 of rotor 7 and the spindle 14. The clearances selected will vary with the diameter of the rotor 7, the supply pressure of the bearing fluid, and the bearing fluid used. It is expected, however, that a typical design would have axial clearances of from 0.0005" to 0.005", while radial clearances between exterior surface 60 of shaft 9 and axial bore 61 of rotor 7 would be 0.0005"–0.002". In operation, high pressure bearing fluid is provided from supply conduit 16 and is conducted through the concentric bore 70 of the shaft 9 to apertures 25. Upon passing through apertures 25, the bearing fluid enters the annular space between rotor 7 and shaft 9. The bearing fluid then divides into a first portion and a second portion. The first portion of said bearing fluid flows longitudinally in the upstream direction in said annular space towards the fore-body cone 6 and then, upon reaching the fore-body cone 6, is deflected radially and eventually exits into the primary fluid boundary layer at the periphery of the fore-body cone 6 and rotor 7 and mixes with said primary fluid. Said second portion of said bearing fluid flows longitudinally in the downstream direction in said annular space towards said spindle 14 and then, upon reaching said spindle 14, is deflected radially and eventually exits into the boundary layer of the combined primary and secondary fluids and mixes with said fluids. In this embodiment of the invention, the high pressure of the bearing fluid displaces the rotor 7 to an axial position along shaft 9 between the fore-body cone 6 and the spindle 14 which is approximately self-centering and provides the desired clearances. Furthermore, the high pressure bearing fluid maintains the rotor 7 in a concentric position relative to the shaft 9 with substantially axi-symmetric radial clearance. Experience has shown that if very small clearances are provided, the mass flow rate of bearing fluid needed to provide satisfactory running clearances is very small in comparison with the primary fluid mass flow rate, so that the direct injection of bearing fluid into the working fluid streams has little impact on the operation of the pressure-exchange ejector 1. Since the bearing fluid is injected directly into the primary and secondary flow stream, it is desirable for the bearing fluid to be of the same substance as either the primary or secondary fluids, or of such composition that it can be easily separated. Since the rotor 7 is free-spinning and does not transmit any torque, the rotor 7 is generally of low mass. Furthermore, since the static pressure on the surface of the rotor is very low, the thrust loading requirement on the bearing is very modest. Hence, the bearing fluid can consist of a gas, or a vapor, or a liquid, or a combination. For the most frictionless operation, gas bearings have been seen to be the best. Gas bearings operated most satisfactorily when the rotor 7 is well balanced both statically and dynamically, and when the radial clearance between shaft 9 and rotor 7 are small. When the ratio of the radius of shaft 9 to the radial clearance between shaft 9 and the axial bore 61 of rotor 7 is 200, satisfactory performance has been observed. It has also been found that for free-spinning operation, the concentricity between the periphery 60 of shaft 9 and its axial bore 70 must be precise to avoid binding of the rotor 7 against the shaft 9, and the apertures 25 must be axi-symmetrically spaced. Furthermore, since, after dividing, the second portion of bearing fluid directed towards and adjacent to the spindle 14 provides the resistance to thrust imposed upon the rotor 7 as a result of the supersonic primary fluid, in the best mode, more fluid should be provided to said second portion of bearing fluid. Hence, it is advantageous to place the apertures 25 at a position rearward of the longitudinal midpoint of the rotor 7. In some applications, it may be advantages to have more than one row of apertures 25 to better control the distribution of bearing fluid. Furthermore, if the rotor 7 is placed in contact with a high temperature primary fluid, the bearing fluid can be used for the dual purpose of providing cooling. In such applications, the clearances and aperture patterns may be modified so as to provide better cooling and liquid bearing fluids can be selected so as to vaporize and absorb the latent heat may be advantageous.

Figure 12:
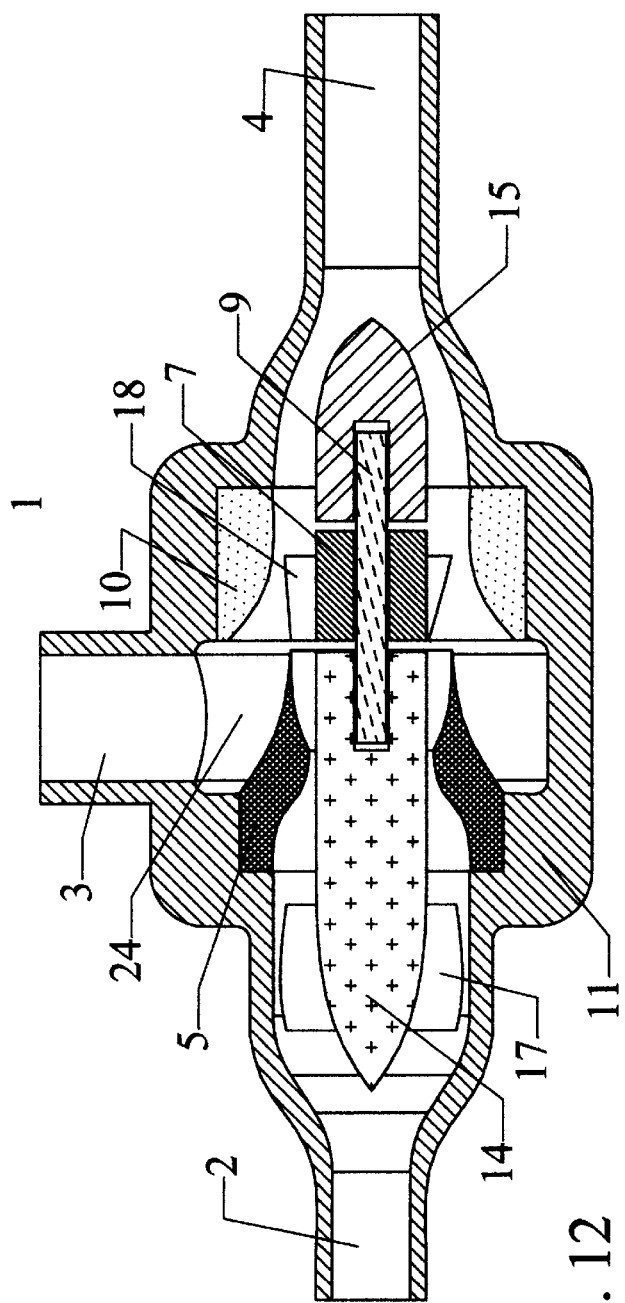
FIG. 12 is a sectional longitudinal view of a second embodiment of the invention whereby the spindle is located upstream of the supersonic nozzle and rotor and an aerodynamic diffuser is placed downstream.

FIG. 12 shows a longitudinal sectional elevation of a second embodiment of the pressure-exchange ejector of the present invention. Ejector 1 is enclosed by a housing 11 which provides a primary fluid inlet conduit 2 and a secondary fluid inlet conduit 3, a rigid support for supersonic nozzle 5, and a secondary fluid plenum 24. Said housing 11 further provides rigid support for aerodynamic shroud 10, rigid mount for the spindle 14, and a mixed-fluid outlet conduit 4. A compressible energetic primary fluid is introduced through said primary-fluid inlet conduit 2 and directed to converging-diverging supersonic nozzle 5 whereby the primary fluid is accelerated to supersonic speeds. The less energetic secondary fluid is introduced through secondary-fluid inlet conduit 3, passing through a plenum 24 which distributes the secondary fluid in an axi-symmetric manner around the exterior of supersonic nozzle 5 prior to being conducted downstream for pressure-exchange with the primary fluid. Immediately downstream of the supersonic nozzle 5 is a rotor 7 which is pivotally mounted so as to enable it to freely spin about the longitudinal axis of shaft 9. In the preferred embodiment shown, the shaft 9 is rigidly connected to the spindle 14 while the rotor is pivotally connected to the shaft 9. In other embodiments of this invention, the shaft 9 may be rigidly connected to the rotor 7, but pivotally connected to said spindle 14.

Figure 13:
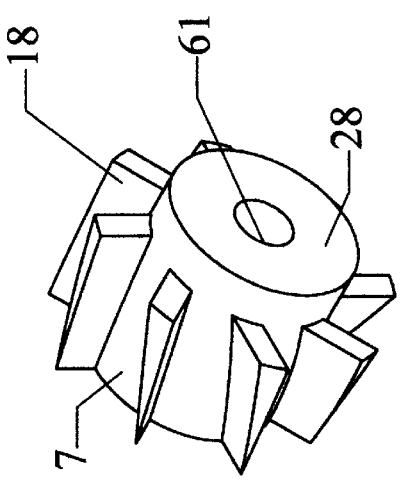
FIG. 13 shows an isometric view of a typical rotor as used in the embodiment of FIG. 12.

As seen in FIG. 13 the body of the rotor 7 in this embodiment has the shape of a cylinder and whose surface is approximately contiguous with that of the adjacent spindle 14 so as to provide a smooth transitional flow path as the fluid progresses from the vicinity of the spindle 14 to the vicinity of the rotor 7. Upon the cylindrical surface of the rotor, a plurality of wedge-shaped vanes 18 are fixedly attached axi-symmetrically about the central longitudinal axis of rotor 7. The number of vanes 18 utilized can vary from two to a multitude, the number being determined by the pressure rise and mass flow ratio desired from the pressure-exchange ejector 1, as well as the diameter of the rotor 7. It is noted that in the preferred embodiment, the vanes 18 have a sharp leading edge and are characterized by a small wedge-angle 29. When the supersonic fluid stream passes over said canted vanes 18, free-spinning rotation is imparted to the rotor 7. An aerodynamic shroud 10 cooperates with said rotor 7 to direct said secondary flow into the vicinity of the primary flow so as to effect pressure-exchange. Downstream of said rotor 7 is placed an aerodynamic diffuser 15 which, in cooperation with the aerodynamic surfaces of the housing 11, serves to further decelerate the mixed fluid in a gradual manner so as to minimize stagnation pressure losses. In this particular embodiment, the aerodynamic diffuser 15 assumes the form of an afterbody. Further downstream of the aerodynamic diffuser 15 is the mixed-fluid outlet conduit 4 from the rear portion of the housing 11. From said mixed-fluid outlet conduit 4, the compressed mixture discharges and is directed by suitable piping to its intended recipient application.

As a result of the supersonic primary fluid emanating from supersonic nozzle 5 and impinging on the rotor 7, a thrust loading in the axial downstream direction is placed on the rotor 7, which would tend to produce contact between rotor 7 and adjacent components if no thrust bearing means were employed. The adjacent components in this embodiment are the spindle 14 and the aerodynamic diffuser 15. Since for most efficient operation of the ejector, the rotor 7 should be substantially free-spinning, a thrust bearing is needed to provide a longitudinal clearance space between said rotor 7 and adjacent components. There are several ways in which this could be accomplished as previously described.

FIG. 14 shows a longitudinal sectional elevation of a third embodiment of the pressure-exchange ejector of the present invention. FIG. 15 shows a blow-up of the interaction zone region in the vicinity of the rotor for the same embodiment. FIG. 16 shows an external perspective view of this embodiment. For purposes of axial thrust minimization, this embodiment is shown in a dual-symmetric inlet configuration, however, with the use of thrust bearings as previously described, this embodiment can also be utilized with single inlets. Ejector 1 is enclosed by a housing 11 which provides a primary fluid inlet conduit 2 and a secondary fluid inlet conduit 3, a rigid support for supersonic nozzle 5, and a secondary fluid plenum 24. Said housing 11 further provides rigid support for aerodynamic shrouds 10, rigid mount for the spindle 14, and an outlet conduit 4 for the mixed fluid. A compressible energetic primary fluid is introduced through said inlet conduit 2 and directed to converging-diverging supersonic nozzle 5 whereby the primary fluid is accelerated to supersonic speeds. The less energetic secondary fluid is introduced through inlet conduit 3, passing through a plenum 24 which distributes the secondary fluid in an axi-symmetric manner around the exterior of supersonic nozzle 5 prior to being conducted downstream for pressure-exchange with the primary fluid. Immediately downstream of the supersonic nozzle 5 is a rotor 7 which is pivotally mounted so as to enable it to freely spin about the longitudinal axis of shaft 9. In the preferred embodiment shown, the shaft 9 is rigidly connected to the spindle 14 while the rotor is pivotally connected to the shaft 9. In other embodiments of this invention, the shaft 9 may be rigidly connected to the rotor 7, but pivotally connected to said spindle 14. As seen in FIG. 17 the body of the rotor 7 in this embodiment has the shape of a disk with a bearing hub whose surface is approximately contiguous with that of the adjacent spindle 14 so as to provide a smooth transitional flow path as the fluid progresses from the vicinity of the spindle 14 to the vicinity of the rotor 7. Upon the flat surfaces of the rotor, a plurality of wedge-shaped vanes 18 are fixedly attached axi-symmetrically about the central longitudinal axis of rotor 7. The number of vanes 18 utilized can vary from two to a multitude, the number being determined by the pressure rise and mass flow ratio desired from the pressure-exchange ejector 1, as well as the diameter of the rotor 7. It is noted that in the preferred embodiment, the vanes 18 have a sharp leading edge and are characterized by a small wedge-angle 29. When the supersonic fluid stream passes over said canted vanes 18, free-spinning rotation is imparted to the rotor 7. An aerodynamic shroud 10 cooperates with said rotor 7 to direct said secondary flow into the vicinity of the primary flow so as to effect pressure-exchange. Downstream of said rotor 7 is placed an aerodynamic diffuser 15 which serves to further decelerate the mixed fluid in a gradual manner so as to minimize stagnation pressure losses. In this particular embodiment, the aerodynamic diffuser 15 assumes the form of a classical radial-flow vaneless diffuser. Further downstream of the aerodynamic diffuser 15 is the mixed-fluid outlet conduit 4 from the peripheral portion of the housing 11 and which, in the present embodiment, has the form of a scroll 69. From said mixed-fluid outlet conduit 4, the compressed mixture discharges and is directed by suitable piping to its intended recipient application.

As a result of the supersonic primary fluid emanating from supersonic nozzle 5 and impinging on the rotor 7, a thrust loading in the axial downstream direction is placed on the rotor 7, which would tend to produce contact between rotor 7 and downstream components if no thrust bearing means were employed. Since for most efficient operation of the ejector, the rotor 7 should be substantially free-spinning, a thrust bearing is needed to provide a longitudinal clearance space between said rotor 7 and adjacent components. There are several ways in which this could be accomplished as previously explained. However, in the present embodiment, the thrust loading can be eliminated by use of a dual-symmetric inlet configuration as shown. If the entire ejector geometry is symmetrical with respect to the azimuthal plane of symmetry 71 of the rotor 7, and the primary fluid supply pressure at inlet conduits 2 is identical on both sides, and the secondary fluid supply pressure at inlet conduits 3 is identical on both sides, then there is virtually no axial thrust loading and no thrust bearing is needed.

Figure 18:
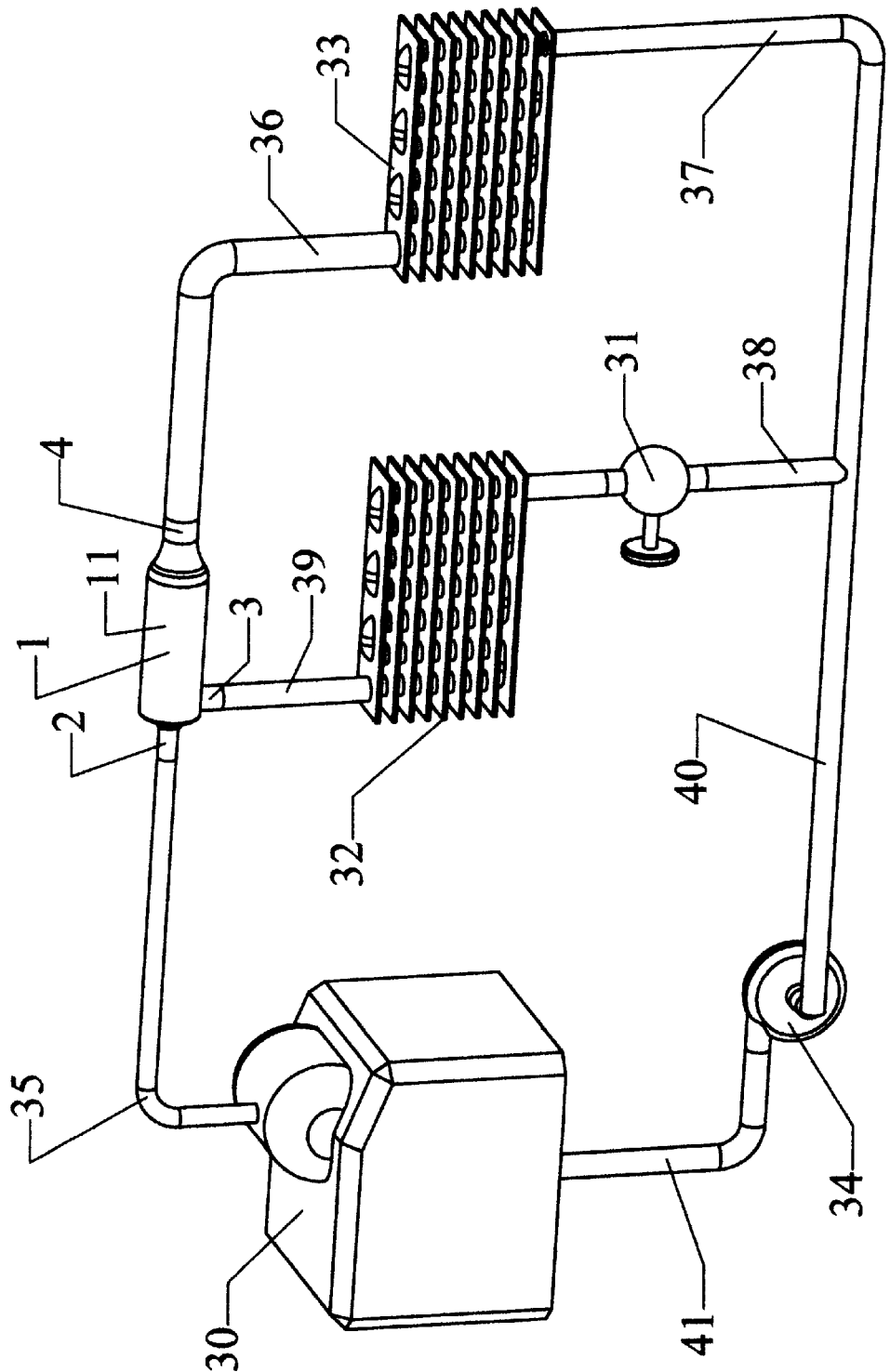
FIG. 18 shows an embodiment of an ejector refrigeration system utilizing the current invention.

The pressure-exchange ejector 1 of this invention is ideally suited for use in environmentally friendly ejector-refrigeration systems capable of using non-polluting refrigerants such as water. A basic embodiment of the use of this invention in such a system is illustrated in FIG. 18. Liquid refrigerant from condenser 33 is discharged into conduit 37. At an appropriate bifurcation, part of the liquid refrigerant is diverted through conduit 38 to an expansion means 31 whereby the refrigerant partially evaporates, absorbing its latent heat, and entering into evaporator 32 at a reduced temperature. The evaporator 32 is placed in the location to be refrigerated and extracts heat from said location, further evaporating the refrigerant. The refrigerant discharges from evaporator 32 as a vapor into conduit 39 which is connected to secondary fluid inlet conduit 3 of pressure-exchange ejector 1. The other part of the liquid refrigerant discharged from condenser 33 into conduit 37 leaves said bifurcation into conduit 40 and is directed to a liquid pump 34 which increases the pressure of the liquid refrigerant, discharging it into conduit 41 which directs the liquid refrigerant to vapor generator 30. Thermal energy may be provided to vapor generator 30 by a variety of means including combustion, solar energy, nuclear energy, electrical energy, and waste heat. Vaporized and pressurized refrigerant is discharged from said vapor generator 30 into conduit 35 and introduced to pressure-exchange ejector 1 through primary fluid inlet conduit 2 as the primary fluid. In the preferred embodiment, the vapor emanating from the vapor generator 30 is superheated. However, in other embodiments of this invention, the vapor may be saturated or multi phase. Said primary fluid, through pressure-exchange and mixing, energizes said secondary fluid and the mixed flow discharges from pressure-exchange ejector 1 through mixed-fluid outlet conduit 4 as a vapor and through conduit 36 and is directed into said condenser 33 where heat is rejected to the environment. This invention is highly beneficial for the environment since it does not require the use of damaging CFC's and can use environmentally friendly water, is capable of effectively utilizing waste heat which is available in such applications as automotive air-conditioning and materials processing. The use of this invention can result in a major improvement in Coefficient of Performance in comparison with prior art while retaining simplicity, and can use energy sources such as natural gas which produce lower levels of greenhouse gases.

Figure 19:
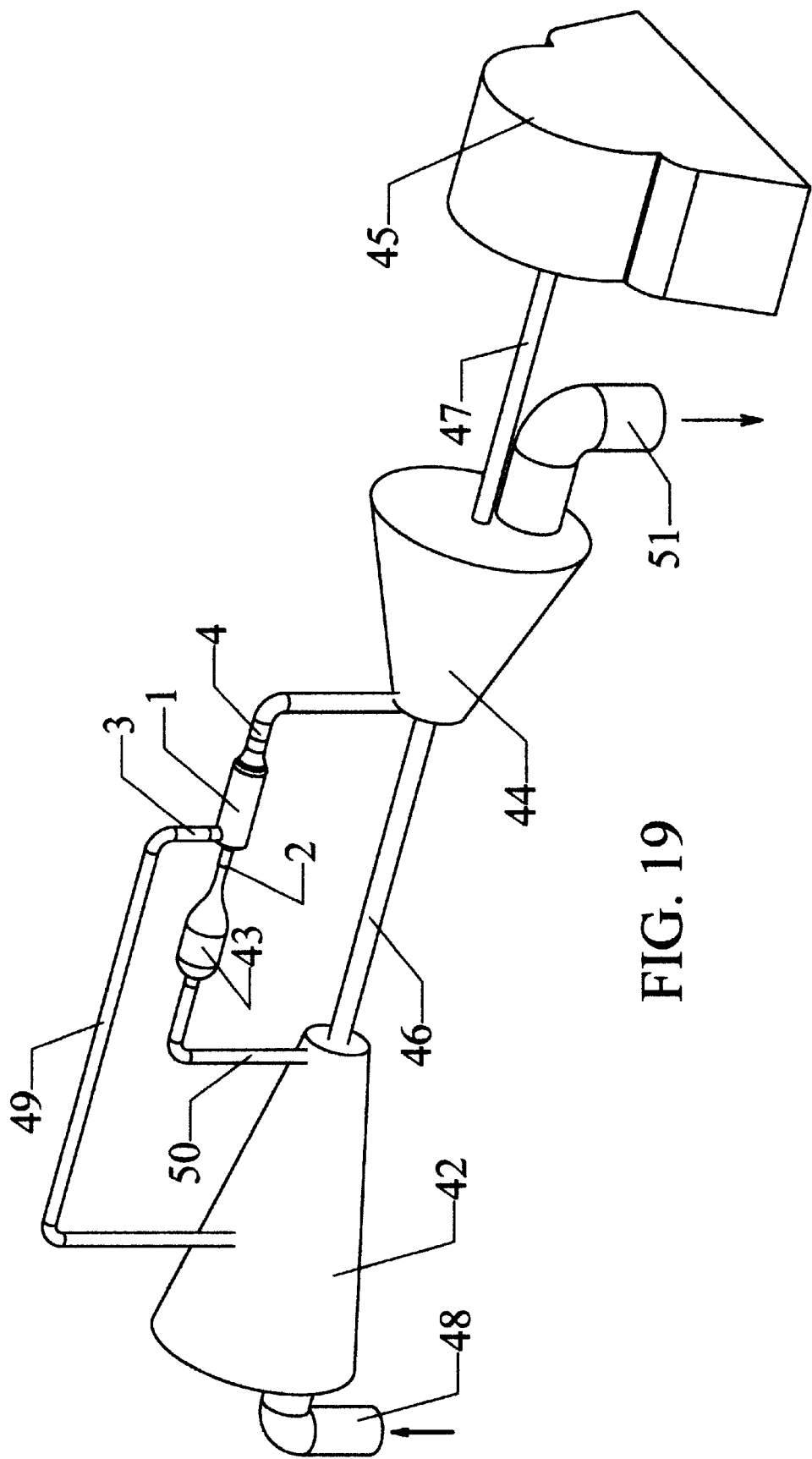
FIG. 19 shows an embodiment of a gas turbine topping cycle using the current invention.

In FIG. 19 is shown and embodiment of this invention utilized as a gas-turbine topping cycle. Ambient air is introduced through conduit 48 to the inlet of a compressor 42 which is driven by turbine 44 through a shaft 46. The energized discharge from the compressor is directed to a combustor 43 through conduit 50 along with fuel. The fuel and air are mixed and burned in combustor 43 and discharged at a very high temperature as the primary fluid to pressure-exchange ejector 1 through primary fluid inlet conduit 2. Intermediate pressure by-pass air from an intermediate stage of said compressor 42 is introduced through conduit 49 to pressure-exchange ejector 1 as the secondary fluid through secondary fluid inlet conduit 3 and energized and mixed with primary fluid inside of pressure-exchange ejector 1. The energetic mixed flow, at lower temperature than the primary fluid, is then directed through mixed-fluid outlet conduit 4 into the inlet of turbine 44 which then powers the turbine whose exhaust discharges to atmosphere through conduit 51. Said turbine 44 drives a load 45 through output shaft 47, or, alternately, the exhaust from said turbine 44 could be used for jet propulsion. The advantageous use of the disclosed invention lies in the fact that the pressure-exchange ejector 1, equipped with a fore-body 6 and rotor 7 capable of withstanding the high gas temperatures of the combustor, by the use of special high temperature materials, and efficiently utilizing the energy to compress cooler by-pass air. The mixed flow discharging from said pressure-exchange ejector 1 through outlet conduit 4 is at a temperature which is compatible with the material requirements on the blades of the turbine 44. Since by the use of the invention herein disclosed the combustor can operate at a higher temperature than that possible with a conventional system, yet allow the turbine inlet temperature to remain at accepted levels without dissipating energy through mixing, the overall cycle efficiency can be increased, thereby saving energy while reducing the emission of greenhouse gases.

Figure 20:
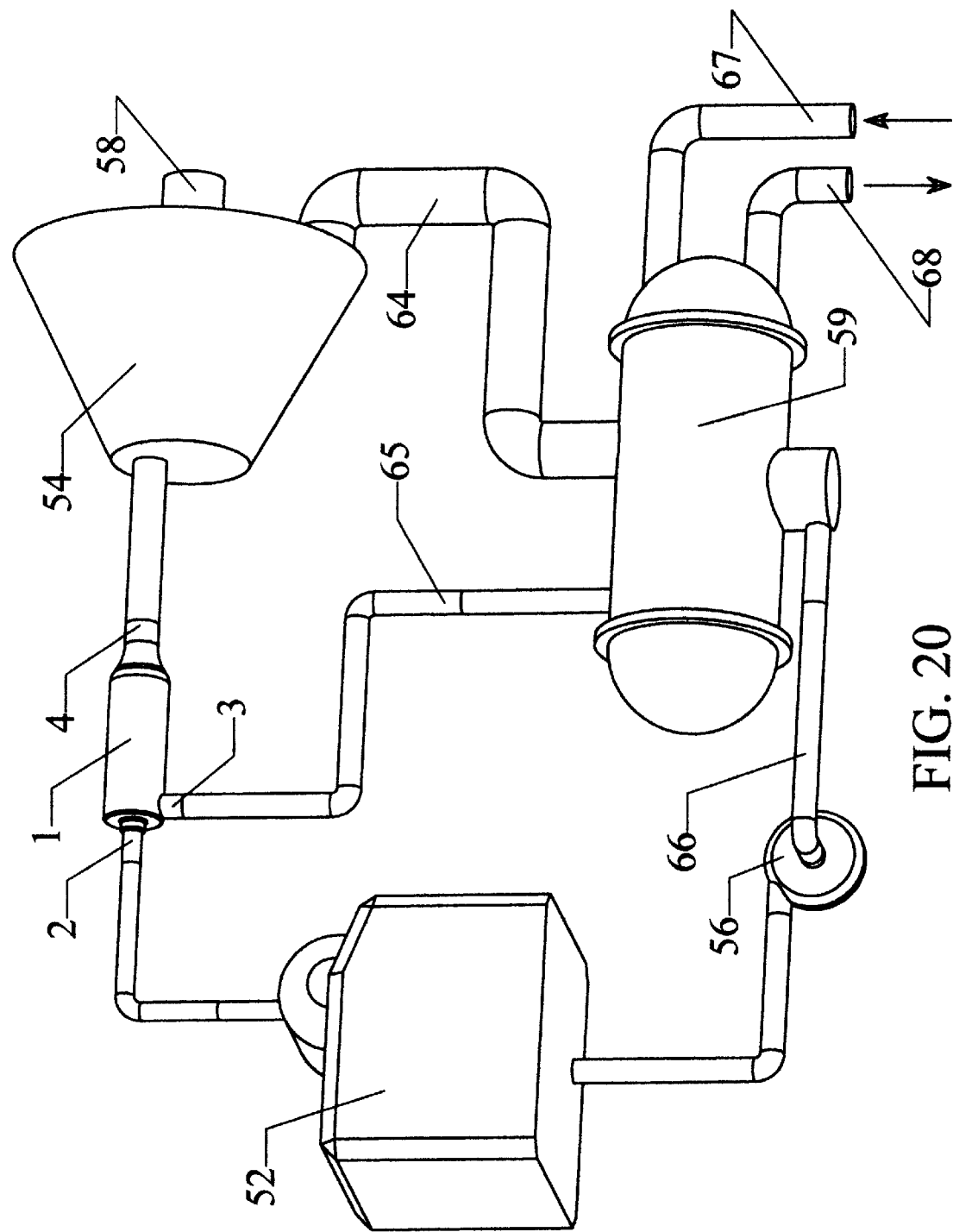
FIG. 20 shows an embodiment of a Rankine power cycle using the current invention.

FIG. 20 shows another embodiment of the current invention used as a topping cycle for a Rankine power cycle. This invention finds application in improving the efficiency of power plants and thereby saving energy and reducing the emission of greenhouse gases. This embodiment utilizes a first and second working fluid, said first working fluid comprising a phase-change substance such as water or a liquid metal, and said second working fluid comprising a non-condensing gas such as air or helium. Said first working fluid is vaporized at very high temperature in boiler/superheater 52. The vapor discharging from boiler/superheater 52 is transported through suitable piping to pressure-exchange ejector 1 through primary fluid inlet conduit 2. The discharge from the pressure-exchange ejector 1, which consists of a mixture of vaporized first working fluid and gaseous second working fluid, exits through mixed-fluid outlet conduit 4 and is conducted to a turbine 54 which produces useful work through shaft 58. The discharge from said turbine 54 through conduit 64 is conducted to condenser/separator 59 where said first working fluid is condensed and the resulting condensate of said first working fluid is conducted to a pump 56 through conduit 66 and thence to boiler/superheater 52. The gaseous second working fluid directed to condenser/separator 59 from said turbine 54 is separated from said second working fluid and directed through conduit 65 to said pressure-exchange ejector 1 through secondary fluid inlet conduit 3. Cooling fluid is provided to the condenser/separator 59 and is conducted through inlet 67 and discharged through conduit 68 after having received the thermal energy rejected by said first and second working fluids in said condenser/separator 59. Said thermal energy rejected from said condenser/separator 59 can be discharged to the environment or, if the working fluids are selected to enable very high operating temperatures, the discharge heat can be used for an another application such as a boiler for an adjunct Rankine power cycle or a heat pump. In operation, said boiler/superheater 52 would discharge primary working fluid into pressure-exchange ejector 1 at a temperature considerably in excess of that considered safe for state-of-the art turbine components. Fore-body 6 and rotor 7 of said ejector 1 would be made of such materials that would enable operation at said elevated temperatures. As a result of the mixing with said second working fluid introduced into ejector 1 through secondary inlet conduit 3 which is at a much lower temperature, the mixed flow discharge from outlet conduit 4 is of a sufficiently low temperature so as to enable the components of turbine 54 to withstand contact with said discharge flow. However, as a result of the higher superheat temperature at the exit of the boiler/superheater 52, and due to the efficient work of compression provided by pressure-exchange ejector 1, an improved cycle thermal efficiency can be obtained, with consequent benefits in terms of saving energy reserves and reduced greenhouse gas emissions.

The invention claimed is:

1. A pressure-exchange ejector (1) comprising:
   a housing (11) with a primary fluid inlet conduit (2), a secondary fluid inlet conduit (3), and a mixed-fluid outlet conduit(4); and,
   a supersonic nozzle (5) fixedly mounted within said housing (11), receiving fluid from said primary fluid inlet conduit (2), which accelerates said primary fluid to form a supersonic stream at the nozzle discharge; and,
   said secondary fluid inlet conduit (3) in communication with a plenum (24) which is internal to said housing (11) and surrounds the downstream end of said supersonic nozzle (5); and,
   an aerodynamic shroud (10) which receives said secondary fluid from said plenum (24) and directs said secondary fluid towards said primary fluid so as to affect pressure-exchange between said primary and secondary fluids; and,
   a spindle (14) rigidly mounted to said housing (11); and,
   a rotor (7) pivotally connected to said spindle (14), said rotor comprising an axi-symmetric revolute body and a plurality of canted vanes (18) fixed to said rotor (7).

2. A pressure-exchange ejector (1) according to claim 1 wherein said vanes have an acute leading edge facing said supersonic stream.

3. A pressure-exchange ejector (1) according to claim 1 wherein a thrust bearing controls the axial clearances of said rotor and adjacent components.

4. A pressure-exchange ejector (1) according to claim 3 whereby said adjacent components are selected from a group consisting of a fore-body (6), a spindle (14), a spacer, a bearing, a shaft, a plate, an afterbody, and an aerodynamic diffuser (15).

5. A pressure-exchange ejector (1) according to claim 1 wherein said rotor is fabricated from a material selected from the group consisting of ceramics, aluminum alloys, titanium alloys, magnesium alloys, nickel alloys, molybdenum alloys, tungsten alloys, alloy steels, plastics, and fiber composites.

6. A pressure-exchange ejector (1) according to claim 1 wherein an aerodynamic diffuser (15) controls the pressure recovery processes of said mixed-fluid after pressure-exchange takes place.

7. A pressure-exchange ejector (1) according to claim 1 wherein said spindle (14) is an axi-symmetric body of revolution rigidly connected to said housing by means of a plurality of radial struts (17) so arranged as to allow the passage of fluid around said spindle (14).

8. A pressure-exchange ejector (1) according to claim 3 wherein said thrust bearing is provided comprising a cylindrical shaft (9) which includes an axial bore (70) for the supply of pressurized bearing fluid, a plurality of radial apertures (25) communicating from said axial bore (70) of said shaft (9) to its periphery (60), said radial apertures (25) placed axi-symmetrically at a longitudinal location within said axial cylindrical bore in said rotor (61), said bearing fluid being supplied through a suitable conduit in said spindle (16), and discharged into said primary and secondary fluids through a path including axial flow in both upstream and downstream directions between the periphery of said shaft (60) and said first axial bore in said rotor (61) and radial flows in the longitudinal clearances between upstream and downstream ends of said rotor (7) and adjacent components.

9. A pressure-exchange ejector (1) according to claim 8 wherein said bearing fluid consists of a substance selected from the group consisting of the primary fluid substance and the secondary fluid substance.

10. A pressure-exchange ejector (1) according to claim 1 wherein said primary fluid is at a higher temperature and a higher molecular weight than the secondary fluid.

11. A pressure-exchange ejector (1) according to claim 1 wherein said rotor (7) is placed downstream of an acuminate revolute fore-body (6) and upstream of said spindle (14), said fore-body (6) substantially coaxial with said supersonic nozzle (5) and placed with apex directly facing into said supersonic stream.

12. A pressure-exchange ejector (1) according to claim 1 wherein said rotor (7) is placed downstream of said spindle (14).

13. A pressure-exchange ejector (1) according to claim 1 wherein:
   said rotor (7) having an azimuthal plane of symmetry (71), said rotor (7) having an axis of rotation perpendicular to said azimuthal plane (71), and with a plurality of vanes (18) whose chords lie substantially parallel to said azimuthal plane; and,
   said housing (11) substantially symmetric about said azimuthal plane (71); and,
   said primary fluid inlet conduit (2), said secondary fluid conduit (3), said supersonic nozzle (5), said aerodynamic shroud (10), said plenum (24), and said spindle (14) being duplicated symmetrically about said azimuthal plane (71).

14. A pressure-exchange ejector (1) according to claim 13 wherein:

an aerodynamic diffuser (15) in the form of a radial-flow vaneless diffuser is placed downstream of the discharge of said rotor (7); and, a scroll (69) is placed at the periphery of said aerodynamic diffuser (15) to collect the mixed-fluid discharge of said aerodynamic diffuser (15) and deliver it to said mixed-fluid outlet conduit (4).

15. In a method of compressing a secondary fluid, the steps of:
    (a) conducting an energetic compressible primary fluid to the primary fluid inlet conduit (2) of a pressure-exchange ejector housing (11);
    (b) accelerating said primary fluid through a supersonic nozzle (5) to Mach numbers in excess of one to form a supersonic stream;
    (c) passing said supersonic primary fluid over a plurality of canted vanes (18) with acute leading edges, said vanes being fixedly mounted on a free-spinning rotor (7);
    (d) forming vane-shocks and expansion fans over each vane (18);
    (e) conducting a secondary fluid to the secondary fluid inlet conduit (3) of a pressure-exchange ejector housing (11) and thence to a plenum (24) inside said housing (11) and surrounding the exterior of said supersonic nozzle (5);
    (f) directing said secondary fluid so as to engage with said vane-shocks and expansion fans to affect pressure-exchange between said primary and secondary flows;
    (g) discharging the primary and secondary fluids to a mixed-fluid outlet conduit in said housing (11).

16. A method of compressing a secondary fluid according to claim 15 wherein after undergoing pressure-exchange, said primary and secondary fluids are allowed to mix and diffuse prior to discharge from said mixed-fluid outlet conduit (4).

17. A method of compressing a secondary fluid according to claim 15 wherein said primary fluid is of higher temperature and higher molecular weight than said secondary fluid.

18. An ejector refrigeration system operating in a closed cycle comprising:
    (a) a vapor generator (30);
    (b) a liquid refrigerant pump (34);
    (c) a condenser (33);
    (d) an evaporator (32);
    (e) an expansion means (31);
    (f) a refrigerant;
    (g) a pressure-exchange ejector (1) according to claim 1.

19. An ejector refrigeration system according to claim 18 wherein said refrigerant is selected from the group consisting of water, alcohols, chlorofluorocarbons, hydrochlorofluorocarbons, ammonia, hydrocarbons, and carbon dioxide.

20. A gas turbine engine operating in an open cycle comprising:
    (a) a compressor (42);
    (b) a turbine (44);
    (c) a combustor (43);
    wherein the improvement comprises a pressure-exchange ejector (1) according to claim 1 with said primary fluid inlet conduit (2) receiving the hot gaseous discharge from said combustor (43); and said secondary fluid inlet conduit (3) is supplied with air from a source, and said mixed-fluid outlet conduit (4) discharging to the inlet of said turbine (44).

21. A gas turbine engine according to claim 20 whereby said source for air to said secondary fluid inlet conduit (3) is partially compressed bleed air (49) from said compressor (42).

22. A Rankine cycle engine operating in a closed cycle with first and second working fluids, comprising:
    (a) a boiler/superheater (52);
    (b) a turbine (54);
    (c) a condenser/separator (59);
    (d) a pump (56);
    (e) a pressure-exchange ejector (1) according to claim 1;
    whereby, said first working fluid is vaporized and energized in said boiler/superheater (52) and conducted to said primary fluid inlet conduit (2) of said pressure-exchange ejector (1), the discharge from said mixed-fluid outlet conduit (4) of said pressure-exchange ejector (1) is conducted to a turbine (54) which produces useful work, the discharge from said turbine (64) is then directed to a condenser/separator (59) whereby heat is rejected to a cooling fluid and said first working fluid is condensed and directed to said pump (56) which discharges into said boiler/superheater (52), said second working fluid discharges from said condenser/separator (59) in the gaseous state and is directed to said secondary fluid inlet conduit (3) of said pressure-exchange ejector (1).

23. A Rankie cycle engine according to claim 22 whereby said cooling fluid provides energy for a second boiler/superheater in an adjunct Rankie power cycle.

24. A Rankie cycle engine according to claim 22 whereby said first working fluid is selected from a group whose phase is liquid under the operating temperature and pressure of said condenser/separator.

25. A Rankie cycle engine according to claim 22 whereby said second working fluid is selected from a group whose phase is gaseous under the operating temperatures and pressures of the cycle.

* * * * *